United States Patent
Kuribayashi

(10) Patent No.: US 6,587,428 B2
(45) Date of Patent: Jul. 1, 2003

(54) INFORMATION RECORD DISC AND INFORMATION RECORDING APPARATUS

(75) Inventor: Hiroki Kuribayashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/196,250

(22) Filed: Jul. 17, 2002

(65) Prior Publication Data

US 2002/0191508 A1 Dec. 19, 2002

Related U.S. Application Data

(63) Continuation of application No. 09/689,825, filed on Oct. 13, 2000, now Pat. No. 6,434,091.

(30) Foreign Application Priority Data

Oct. 15, 1999 (JP) .............................. 11-293814

(51) Int. Cl.$^7$ ................................................. G11B 7/00
(52) U.S. Cl. ................................ 369/275.4; 369/47.28; 369/59.25
(58) Field of Search ........................... 369/47.1, 47.28, 369/47.46, 47.48, 53.1, 53.2, 53.31, 53.44, 59.1, 58.12, 59.25, 275.1, 275.3, 275.4, 44.13

(56) References Cited

U.S. PATENT DOCUMENTS

| | | | | |
|---|---|---|---|---|
| 5,740,152 A | * | 4/1998 | Yokogawa et al. | 369/275.3 |
| 5,878,007 A | * | 3/1999 | Matsumoto et al. | 369/44.34 |
| 5,907,448 A | * | 5/1999 | Watanabe et al. | 360/77.04 |
| 6,069,870 A | | 5/2000 | Maeda et al. | 369/275.4 |
| 6,192,015 B1 | | 2/2001 | Kim | 369/48 |

* cited by examiner

*Primary Examiner*—Muhammad Edun
(74) *Attorney, Agent, or Firm*—Morgan, Lewis & Bockius LLP

(57) ABSTRACT

An information record disc is provided with: a track formed on a disc surface, on which record information to be reproduced is recorded or to be recorded; and a wobble formed on the track such that a phase of the wobble is changed at a plurality of locations on the track and that positional information indicative of a position on the disc surface is recorded as a change in the phase of the wobble. The record information is arranged at a predetermined arrangement cycle, and includes a synchronization signal to attain a synchronization when the record information is recorded or reproduced. An interval at which the phase of the wobble is changed on the track is equal to N times (N is an integer equal to or greater than 1) of the predetermined arrangement cycle of the synchronization signal when the record information is recorded on the track.

4 Claims, 15 Drawing Sheets

FIG. 5

| SECTOR No. | SECTOR No. DATA (4 BITS) | PRE-DATA (8 BITS) |
|---|---|---|
| 0 | 0000 | ADRESS BIT |
| 1 | 0001 | ADRESS BIT |
| 2 | 0010 | ADRESS BIT |
| 3 | 0011 | PARITY BIT |
| 4 | 0100 | PARITY BIT |
| 5 | 0101 | PARITY BIT |
| 6 | 0110 | NOT USED |
| 7 | 0111 | NOT USED |
| 8 | 1000 | NOT USED |
| 9 | 1001 | NOT USED |
| 10 | 1010 | ADRESS BIT |
| 11 | 1011 | ADRESS BIT |
| 12 | 1100 | ADRESS BIT |
| 13 | 1101 | PARITY BIT |
| 14 | 1110 | PARITY BIT |
| 15 | 1111 | PARITY BIT |

FIG. 6

| BIT IN PRE-INFOMATION | CONVERSION RESULT |
|---|---|
| SYNC PATTERN | 0 0 |
| 0 | 1 0 |
| 1 | 1 1 |

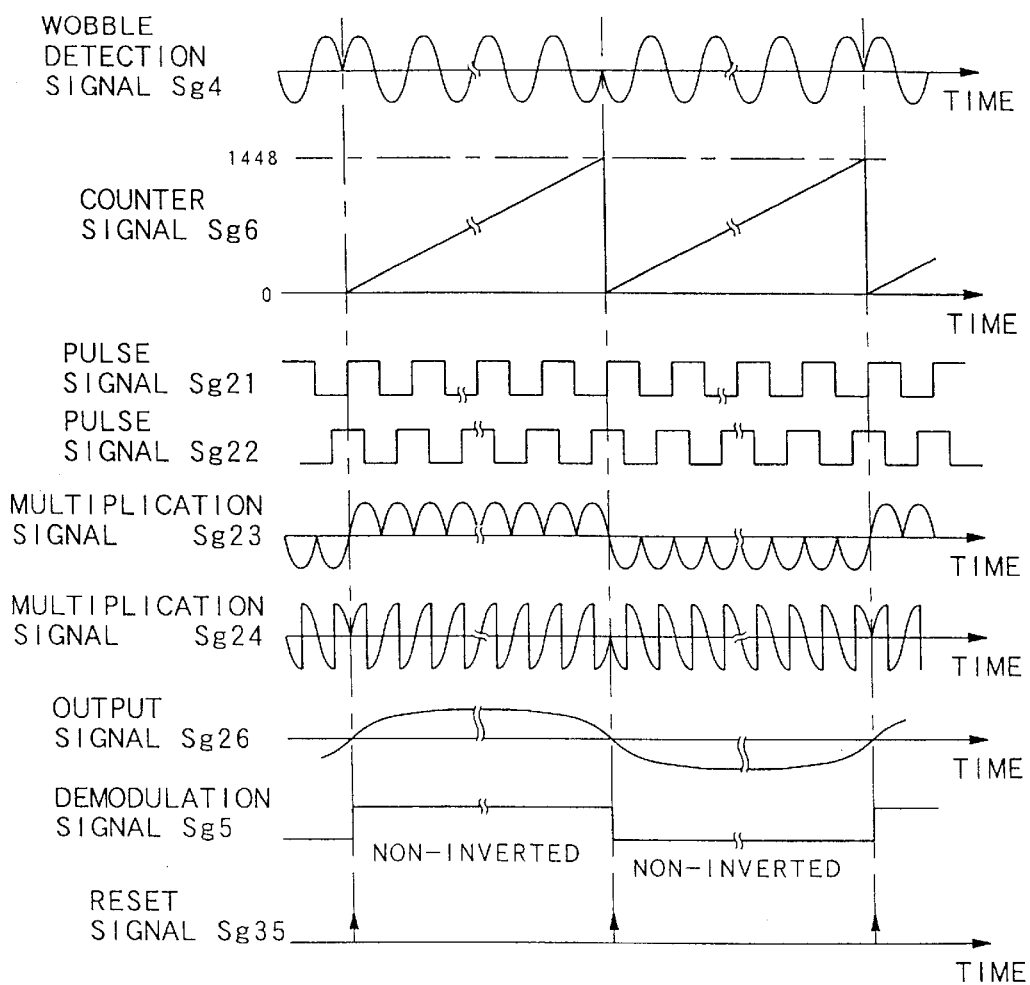
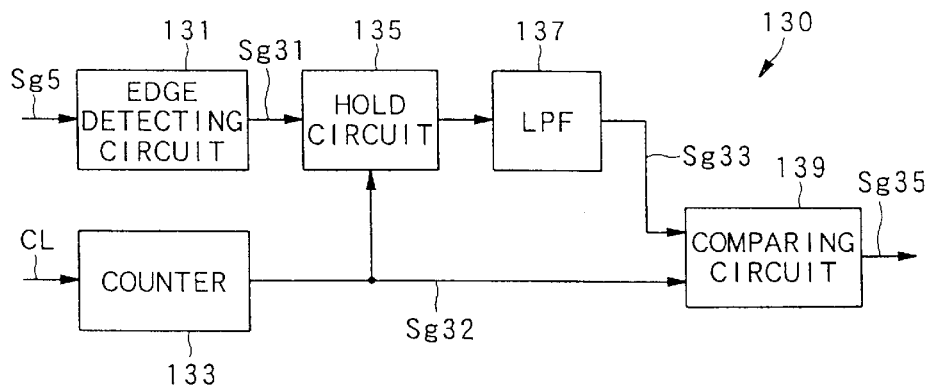

INFORMATION RECORD DISC AND INFORMATION RECORDING APPARATUS

This application is a continuation of application Ser. No. 09/689,825 filed Oct. 13, 2000 now U.S. Pat. No. 6,434,091.

BACK GROUND OF THE INVENTION

1. Field of the Invention

The present invention relates to an information record disc, such as an optical disc, which is used to record information, and more particularly relates to an information record disc, which has a wobbled record track and on which information can be additionally written and re-written. Moreover, the present invention relates to an information recording apparatus for recording information onto such an information record disc.

2. Description of the Related Art

A CD (Compact Disk) on which information can be recorded or written just once is typically known as a CD-R (CD-Recordable) Also, a CD on which information can be re-written a plurality of times is typically known as a CD-RW (CD-ReWritable). Record tracks of the CD-R and the CD-RW are slightly meandering or wobbling in a radius direction. This meandering condition of the record track is typically referred to as a "wobbling" or "wobble".

On the other hand, in order to record information onto a disc or reproduce the information recorded on the disc, there is required the information for indicating an absolute address (or an absolute time) on the disc. Hereafter, this information is referred to as "pre-information".

In case of the CD-R and the CD-RW, the pre-information is recorded on the disc by FM-modulating the wobble. Actually, a carrier signal used to form the wobble is FM-modulated in accordance with the pre-information. The wobble corresponding to a wave form of this FM-modulated carrier signal is formed on the record track. Accordingly, the pre-information is recorded on the disc.

When recording the information onto the CD-R or the CD-RW or when reproducing the information recorded on the CD-R or the CD-RW, a recording apparatus or a reproducing apparatus reads in the wobble formed on the CD-R or the CD-RW, and controls a rotation number of the CD-R or the CD-RW or generates a record track, in accordance with the information obtained from the wobble. For this reason, it is not desirable that the frequency of the wobble is widely changed. Thus, an amount is very slight which is allowable for the change in the frequency of the wobble, in order to superimpose the pre-information onto the wobble. For example, if the frequency of the wobble is 22.05 kHz, the amount is only ±1 kHz which is allowable for the change in the frequency of the wobble in order to superimpose the pre-information. Consequently, it is not easy for the recording apparatus or the reproducing apparatus to accurately detect the pre-information from the wobble. This results in a problem that the accuracy to specify a position on the disc is poor.

If the accuracy to specify the position on the disc is poor, a record position may be easily deviated when linking the new record information with the record information already recorded on the disc. Consequently, for example, there may be a case that the new record information is overwritten onto the already recorded information or that a gap which cannot be estimated is induced between the already recorded information and the new record information. In order to avoid such a case, in the CD-R and the CD-RW, a buffer region is reserved by recording dummy data following the record information when the operation for writing the record information is ended. However, this has a defect that the buffer region brings about a loss of a memory capacity of the disc.

On the other hand, a recordable DVD, such as a DVD-RAM and the like, uses a method different from those of the CD-R and the CD-RW to record the pre-information on the disc. That is, the recordable DVD employs a method of forming a pre-pit (embossed pit) on the disc to thereby record the pre-information on the disc.

However, this method has the configuration in which the pre-pit is formed only on the recordable DVD, which results in a largely structural difference between a disc dedicated to a reproduction and a recordable disc. Thus, it is difficult to attain a compatibility between both of them. For example, this brings about a problem that it is difficult for a common reproduction unit to reproduce the information recorded on the recordable disc having the pre-pit and also reproduce the information recorded on the disc which is dedicated to the reproduction and does not have the pre-pit.

SUMMARY OF THE INVENTION

The present invention is proposed in view of the above mentioned problems. It is therefore an object of the present invention to provide an information record disc, which can easily attain a compatibility between a record disc dedicated to a reproduction and a recordable record disc and also which can allow to detect a record position of record information on a disc easily and accurately, as well as an information recording apparatus, which can detect a record position of record information on a disc easily and accurately.

The above object of the present invention can be achieved by an information record disc provided with: a track formed on a disc surface, on which record information to be reproduced is recorded or to be recorded; and a wobble formed on the track such that a phase of the wobble is changed at a plurality of locations on the track and that positional information indicative of a position on the disc surface is recorded as a change in the phase of the wobble. The record information is arranged at a predetermined arrangement cycle, and includes a synchronization signal to attain a synchronization when the record information is recorded or reproduced. An interval at which the phase of the wobble is changed on the track is equal to N times (N is an integer equal to or greater than 1) of the predetermined arrangement cycle of the synchronization signal when the record information is recorded on the track.

According to the information record disc of the present invention, when the record information is recorded on the track, the interval at which the phase of the wobble is changed is equal to N times of the predetermined arrangement cycle of the synchronization signal. This implies that a certain positional relationship exists between the position at which the phase of the wobble is changed and the position at which the synchronization signal in the record information is placed. Thus, on the basis of such a certain positional relationship, just by detecting the change of the phase of the wobble, the position at which the synchronization signal is recorded or the position at which the synchronization signal is to be recorded can be specified or identified easily. Therefore, it is possible to easily specify or identify the position at which the record information is to be recorded on the disc.

Further, since the positional information indicative of the position of the disc surface is recorded as the change of the phase of the wobble, it is possible to record the positional information clearly while maintaining the frequency of the wobble constant. Therefore, while satisfying such a demand that the information obtained from the wobble is used for the rotation control of the disc and the generation of the record clock, it is possible to improve the detection accuracy of the positional information. Further, it is possible to accurately detect the change of the phase of the wobble, and thereby accurately detect the record position of the record information on the disc.

As detailed above, according to the information record disc of the present invention, it is possible to specify the record position of the information on the information record disc easily and accurately. Thus, it is possible to prevent the new record information from being overwritten to the already recorded information, without reserving the buffer region by using the dummy data and the like. Thus, it is possible to exclude the unnecessary usage of the memory region on the information record disc, and also possible to substantially increase the memory capacity of the information record disc.

In addition to such effects, according to the information record disc of the present invention, it is possible to easily attain the compatibility between the information record disc dedicated to the reproduction and the recordable information record disc. Accordingly, the reproduction of the information recorded on the information record disc can be attained by using the common reproducing apparatus without considering the difference between the information record disc dedicated to the reproduction and the recordable information record disc. This attainment contributes to the simplification and the cost reduction in the structure of the reproducing apparatus.

In one aspect of the information record disc of the present invention, the synchronization signal in the record information is placed at a position at which the phase of the wobble is changed when the record information is recorded on the track.

According to this aspect, it is possible to specify the position at which the synchronization signal is recorded or to be recorded, just by detecting the change of the phase of the wobble. Thus, it is possible to easily specify the position at which he record information is to be recorded on the disc. Incidentally, in case that N=1, the synchronization signal is always placed at a position at which the phase of the wobble is changed, and the phase of the wobble is always changed at the position where the synchronization signal is placed. On the other hand, in case that N is not less than 2, the synchronization signal is always placed at the position where the phase of the wobble is changed, but the phase of the wobble is not always changed at the position where the synchronization signal is placed.

In another aspect of the information record disc of the present invention, the change of the phase of the wobble is an inversion of the phase.

According to this aspect, by recording the positional information as the inversion of the phase of the wobble, the detection of the positional information can be easily performed. Even if the noise is induced in the detection of the positional information, it is still possible to accurately detect the positional information.

Further, rather than to detect a subtle change in the frequency of the wobble, it is easier to detect the inversion of the phase of the wobble, it is possible to improve the detection accuracy of the positional information by recording the positional information as the inversion of the wobble, as compared with the detection accuracy of the pre-information in the conventional CD-R or CD-RW.

In this aspect, the positional information may be two-values data of an RLL (Run Length Limited) code in which a longest inversion interval is limited.

By constituting in this manner, it is possible to limit the interval of the inversion of the phase of the wobble. As a result, it is possible to avoid such an occasion that the inversion of the phase does not occur for a long period of time. Thus, it is possible to surely detect the inversion of the phase.

In another aspect of the information record disc of the present invention, a cycle of the wobble is equal to 4P times (P is an integer equal to or greater than 1) of a cycle of a standard clock, which is used as a standard to record the record information, and is also equal to 1/M (M is an integer equal to or greater than 2) of the predetermined arrangement cycle of the synchronization signal.

According to this aspect, in case of using the Costas loop method for the detection of the wobble, a first signal for wave-detection in phase to the wobble and a second signal for wave-detection, which is out of the phase by ¼ cycle with respect to the first signal for wave-detection, may be used. Then, those first and second signals for wave-detection are generated from the standard clock used for the detection of the wobble. In this case, if the cycle of the wobble is set to 4P times of the cycle of the standard clock, it is possible to easily generate the second signal for wave-detection which is out of the phase by ¼ cycle with respect to the first signal for wave-detection. In addition, the cycle of the wobble may be set to 1/M of the predetermined arrangement cycle of the synchronization signal, so that the correspondence between the wobble and the record information can be simplified.

The above object of the present invention can be also achieved by an information recording apparatus for recording record information to be reproduced onto the above described information record disc o the present invention (including various aspects thereof). The information recording apparatus is provided with: a wobble detecting device for detecting a wobble signal corresponding to the wobble from the information record disc; a phase detecting device for detecting a phase of the wobble signal and then generating a detection signal indicative of a change in the phase of the wobble signal; a positional information demodulating device for demodulating the positional information in accordance with the detection signal; a signal generating device for detecting a timing when the phase of the wobble signal is changed from the detection signal, and then generating a control signal indicative of the predetermined arrangement cycle of the synchronization signal in the record information on the basis of the detected timing; and a recording device for specifying a record position on the disc surface on the basis of the positional information demodulated by the positional information demodulating device and the control signal generated by the signal generating device, and then recording the record information from the specified record position so that the interval at which the phase of the wobble is changed is equal to N times the predetermined arrangement cycle of the synchronization signal.

According to the information recording apparatus of the present invention, the positional information indicating the position on the disc is recorded as the change in the phase of the wobble. The wobble detecting device detects the wobble signal corresponding to the wobble having such a phase change from the information record disc. In the detected wobble signal, the positional information is included as the change in the phase. Then, the phase detecting device detects the phase of the wobble signal, and generates the detection signal indicating the change in the phase of the wobble signal. Then, the positional information demodulating device demodulates the positional information on the basis of this detection signal. Further, the signal generating device detects the timing when the phase of the wobble is changed out of the detection signal, and generates the control signal indicating the predetermined arrangement cycle of the synchronization signal on the basis of this detected timing. Then, the recording device specifies the position on the disc on the basis of the positional information and the control information, and starts recording the record information from this specified position. At this time, the record information is recorded to have a certain positional relationship so that the interval at which the phase of the wobble is changed becomes N times of the predetermined arrangement cycle of the synchronization signal.

Accordingly, it is possible to easily and accurately specify the position at which the record information is to be recorded on the basis of the detection result of the change in the phase of the wobble, and thereby possible to accurately record the record information at this specified position.

In one aspect of the information recording apparatus of the present invention, the phase detecting device comprises an averaging device for averaging timings when the detected phases of the wobble signal are changed.

According to this aspect, it is possible to improve the accuracy of the timing at which the phase is changed. As a result, it is possible to improve the accuracy of the control signal generated by the signal generating device, so that it is possible to improve the accuracy of the record position of the record information.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram showing an actual content of pre-information in the embodiment of the present invention;

FIG. 6 is a diagram showing a table describing a rule to convert a bit of the pre-information in the embodiment of the present invention;

FIG. 15 is a wave form diagram showing a signal wave form illustrating an operation of the PSK demodulating circuit shown in FIG. 14;

FIG. 16 is a block diagram showing a phase detecting circuit in the embodiment of the present invention;

DETAILED DESCRIPTION OF THE PREFERRED EMBODIMENTS

Preferred embodiments of the present invention will be explained below with reference to the attached drawings.

I. Optical Disc

Figure 1:
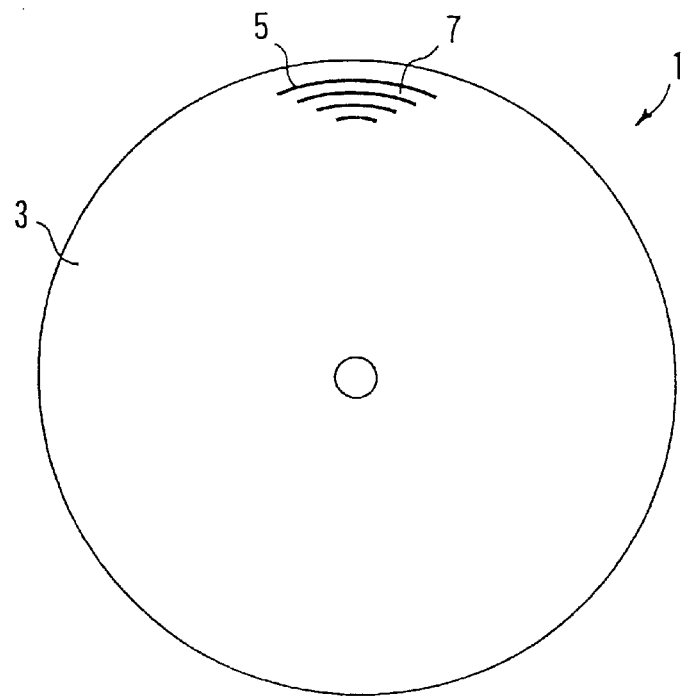
FIG. 1 is a plan view of an optical disc as an embodiment of the present invention.

At first, an optical disc is described. FIG. 1 shows an optical disc 1 serving as an information record disc according to an embodiment of the present invention. The optical disc 1 is a disc having a radius and a thickness which are substantially similar to those of the CD-R or the DVD-R. The optical disc 1 is a record disc on which record data can be recorded, and also a disc of a linking type or a re-writable type on which the record data can be re-written one time or a plurality of times. It is assumed that the optical disc 1 is sold as a so-called "empty disc" under a condition that the record data is not still recorded thereon at all or only special control information is recorded thereon. Then, it is assumed that the record data is recorded by a later-described recording/reproducing apparatus 70 in accordance with an intention of a user buying the optical disc 1 and the like.

As shown in FIG. 1, a groove track 5 and a land track 7 are formed on at least one disc surface 3 of the optical disc 1. The groove track 5 is a track on which record data is to be recorded. The record data is data to be recorded on the disc for the purpose of reproduction, edition, storage, distribution and the like. For example, it includes music data, picture data, computer program data, control data to control a reproducing apparatus, and data to manage data recorded on the disc. The record data is recorded as a pit row on the groove track 5.

The land track 7 is a track to guide a light beam to record or read out the record data.

The groove track 5 and the land track 7 are extended spirally or coaxially with a center of the optical disc 1 as a standard. Also, the groove track 5 and the land track 7 are arranged alternately in a radius direction of the optical disc 1.

Although the pre-pit is formed on the disc surface of the conventional DVD-RAM, the pre-pit is not formed on the disc surface 3 of the optical disc 1 in this embodiment.

Figure 2:
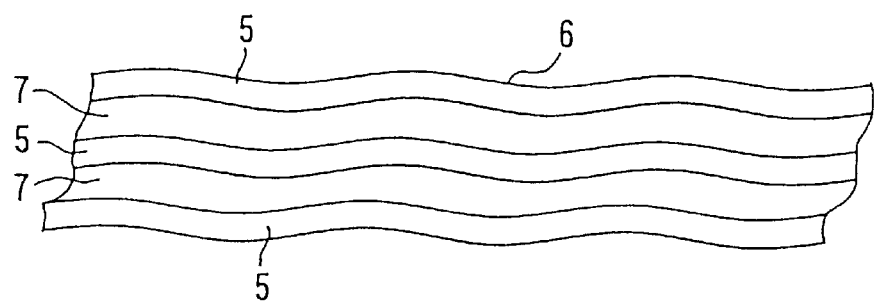
FIG. 2 is an enlarged plan view showing a track formed on the optical disc shown in FIG. 1.

FIG. 2 shows the groove track 5 and the land track 7 of the optical disc 1 in the condition that they are partially enlarged. As shown in FIG. 2, a wobble (wobbling) 6 is formed in the groove track 5. The wobble 6 is formed by the meanders of the groove track 5 in the radius direction of the optical disc 1. A frequency of the meanders of the groove track 5 is constant in this embodiment. Hereafter, the frequency of the meanders of the groove track 5 is referred to as a "wobble frequency".

The wobble 6 is formed when pre-information is recorded on the disc through the meanders of the groove track 5. The pre-information is information indicative of an absolute address (or an absolute time) on the optical disc 1. Hereafter, the absolute address on the optical disc 1 is referred to as a "pre-address". The pre-information is digital data of two bits. In this embodiment, the pre-information is recorded on the optical disc 1 by inverting a phase of the wobble 6 oscillating at a certain cycle, depending on whether the pre-information is "1" or "0".

Figure 10:
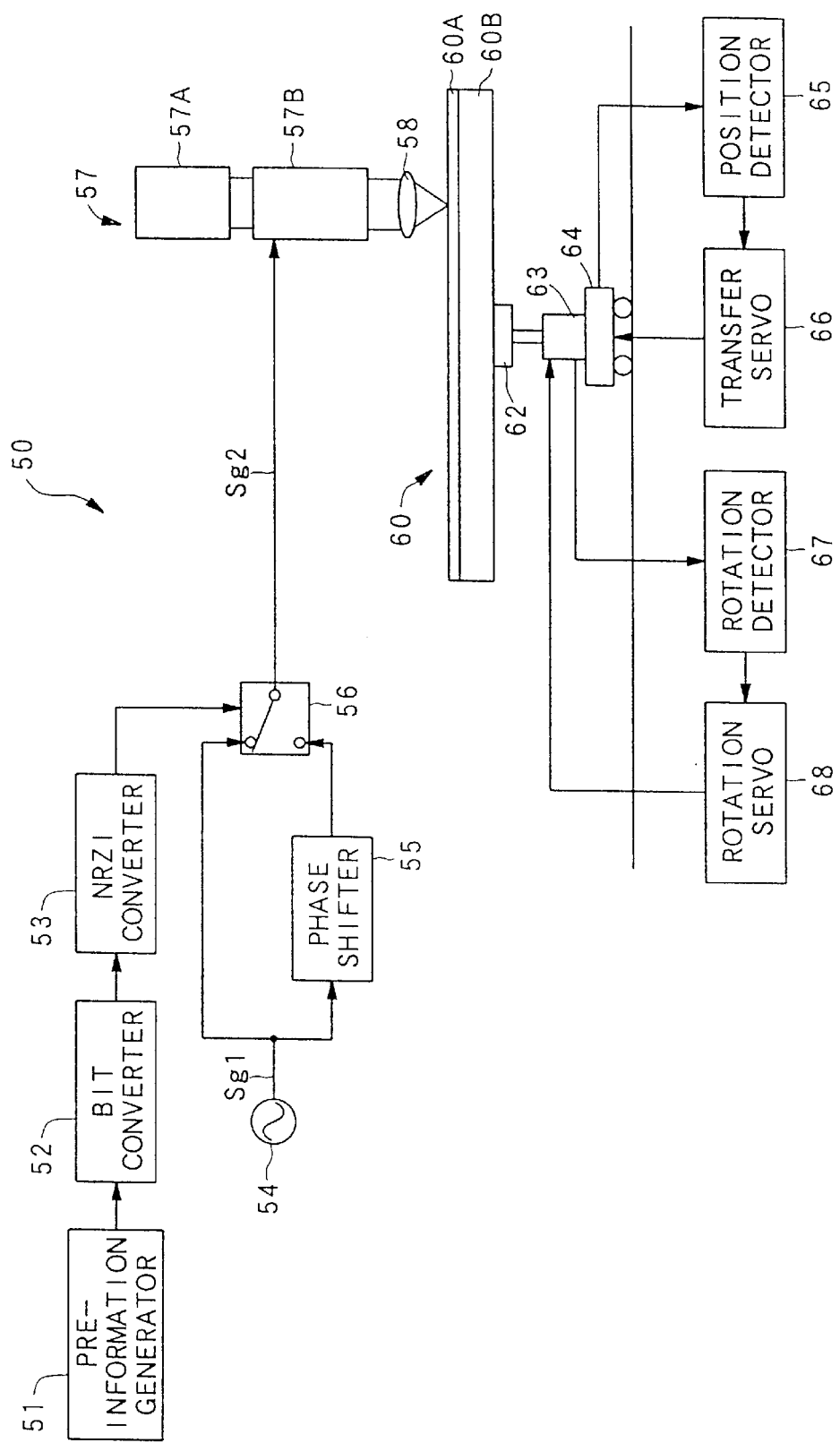
FIG. 10 is a block diagram showing a disc manufacturing apparatus in the embodiment of the present invention.

The wobble 6 is formed at a stage of manufacturing the optical disc 1, as a part of a physical structure of the optical disc 1. That is, the pre-information recorded as the wobble 6 is recorded on the optical disc 1 at the stage of manufacturing the optical disc 1. The formation of the wobble 6, namely, the record of the pre-information on the optical disc 1 is done by a disc manufacturing apparatus 50 (FIG. 10).

On the contrary, the record data is not recorded at the stage of manufacturing the optical disc 1. The record data is recorded by the recording/reproducing apparatus 70, in accordance with a free intention of a user and the like, after the optical disc 1 is sold.

Figure 3:
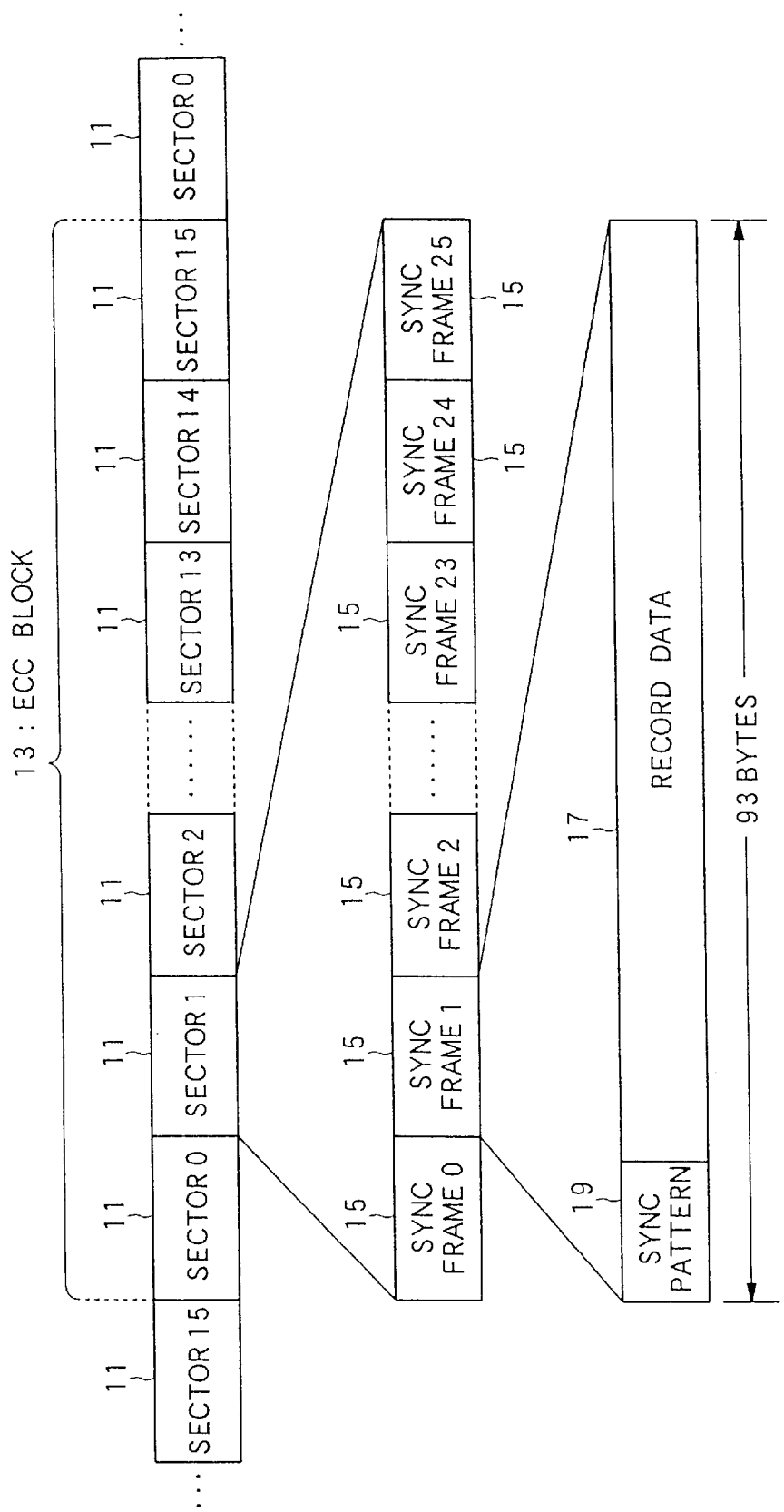
FIG. 3 is a diagram showing a structure of record data in the embodiment of the present invention.

Next, the structure of the record data will be described below. FIG. 3 shows the structure of the record data (record format). The optical disc 1 according to this embodiment employs the structure of the record data substantially similar to that of the conventional DVD. As shown in FIG. 3, the record data is divided into a plurality of sectors 11. Each sector 11 is divided into a plurality of synchronization frames 15. Each synchronization frame 15 is composed of a synchronization pattern 19 and record data 17. The synchronization pattern 19 is located at a lead of each synchronization frame 15.

When this is explained in further detail, each sector 11 is divided into 26 synchronization frames 15 (synchronization frames 0 to 25). A size of each synchronization frame 15 is 93 bytes. An ECC (Error Correction Code) block 13 is composed of 16 sectors 11 (sectors 0 to 15) which are continuously arranged. The ECC block 13 is a unit block in an error correcting process in reproducing the record data.

The synchronization pattern 19 is data indicative of a boundary between the synchronization frames 15 adjacent to each other. And, the synchronization pattern 19 functions as a synchronization signal to attain a synchronization in recording or reproducing the record data. The synchronization pattern 19 is always located at the lead of the synchronization frame 15. So, when the record data is considered as a whole, the synchronization patterns 19 are arranged at a certain interval (a certain arrangement cycle) in the record data. Thus, when the record data is recorded on the groove track 5 of the optical disc 1, the synchronization patterns 19 are arranged at the certain interval on the groove track 5.

The record of the record data on the optical disc 1 will be described below. When the record data is recorded onto the optical disc 1, the record data is converted into a modulation data suitable for the record on the optical disc 1. An 8/16 modulation method is used as a method of converting data into the modulation data. This conversion method is typically known in the technical field with regard to the DVD.

The record data 17 included in each synchronization frame 15 is converted into the modulation data in which a bit. inversion interval is limited to 3T to 11T, by using the 8/16 modulation. On the other hand, the synchronization pattern 19 included in each synchronization frame 15 is converted into the modulation data having a pattern in which the bit inversion interval is 14T. In this way, the synchronization pattern 19 is converted into the modulation data including a special pattern which is not usually used as the record data 17. Thus, the identification between the record data 17 and the synchronization pattern 19 can be made easier. Also, a length of each synchronization frame 15 is 1488T as the modulated result by the 8/16 modulation. By the way, "T" is a unit indicative of a time interval of one bit of the record data. Also, the time interval of the one bit of the record data is determined by a clock cycle of a record clock CL generated within he recording/reproducing apparatus 70.

Figure 11:
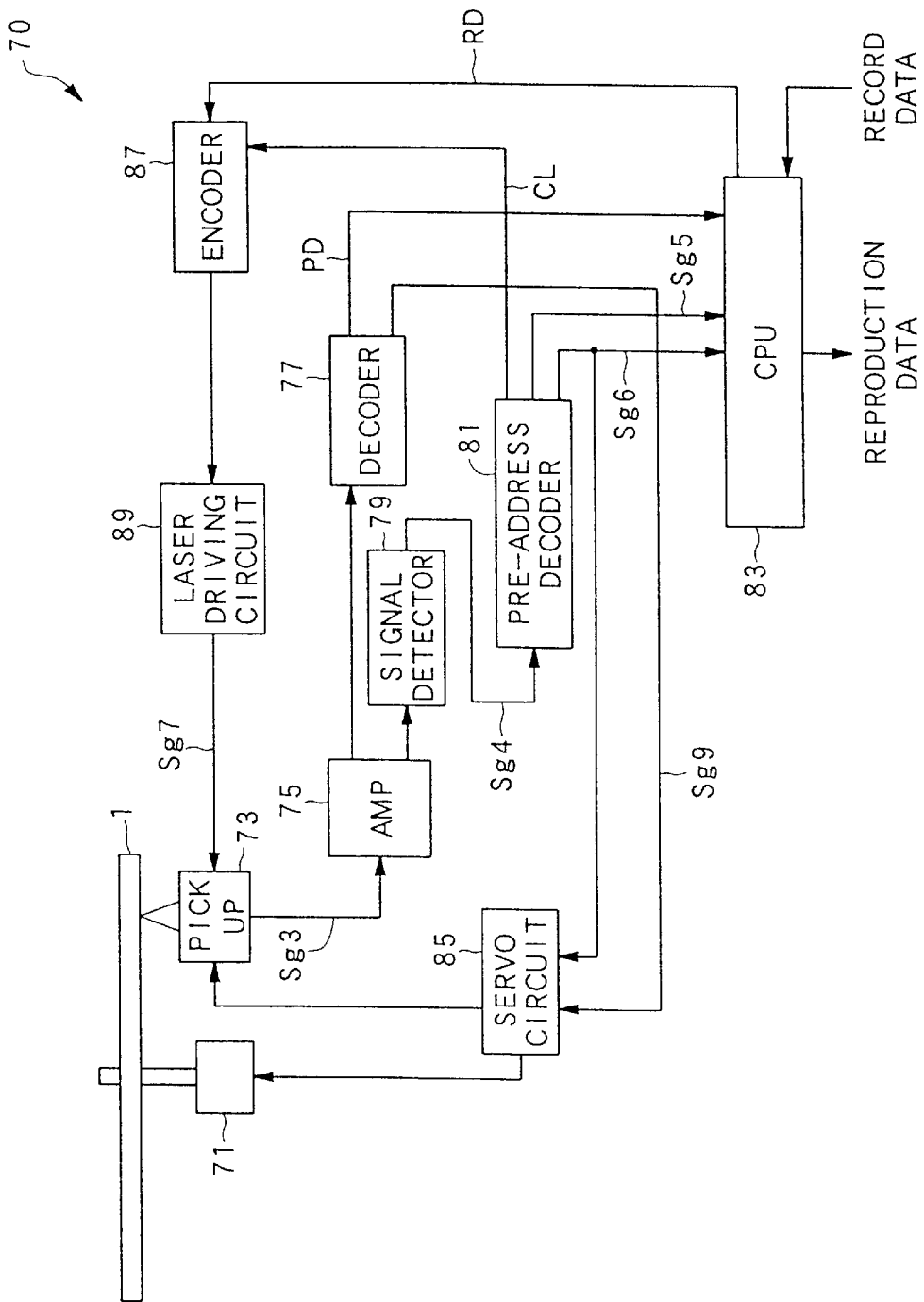
FIG. 11 is a block diagram showing an information recording apparatus in the embodiment of the present invention.

The record data modulated by the 8/16 modulation (the synchronization pattern 19 and the record data 17) is recorded as a pit row on the groove track 5 of the optical disc 1, after a process such as an NRZI (Non Return to Zero Inversion) conversion and the like is performed on the record data. The record data is recorded on the optical disc 1 by the recording/reproducing apparatus 70 (FIG. 11).

Figure 4:
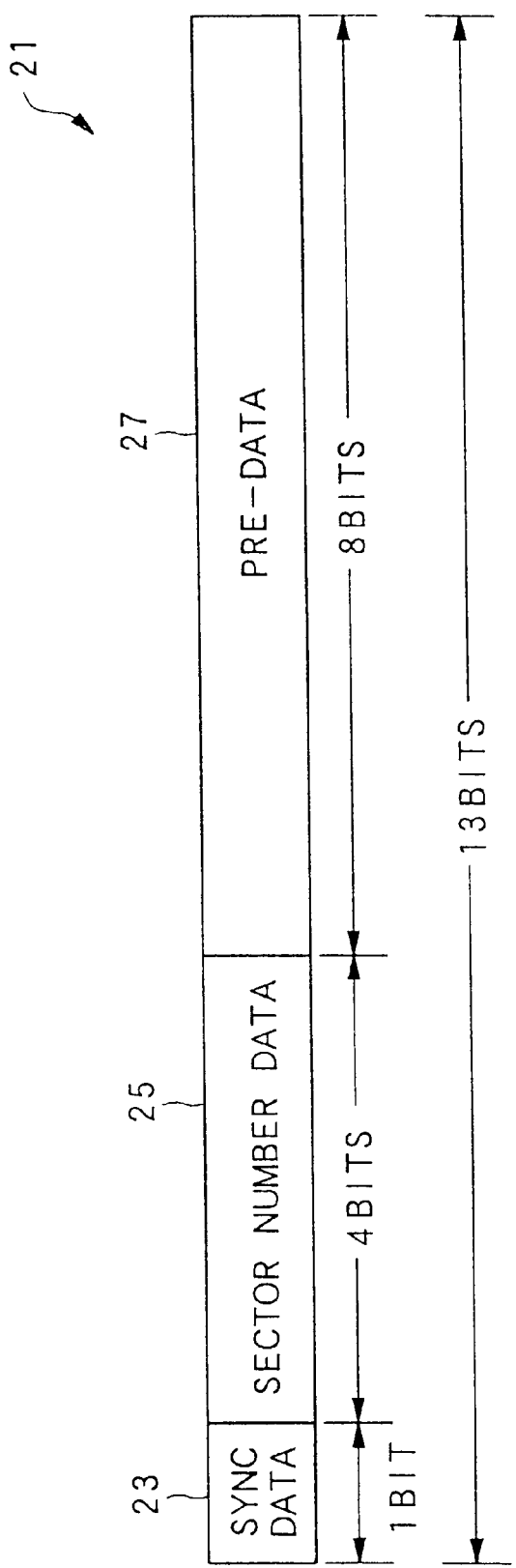
FIG. 4 is a diagram showing a structure of pre-information in the embodiment of the present invention.

Next, the structure of the pre-information will be described below. FIG. 4 shows the structure of pre-information 21. As shown in FIG. 4, the pre-information 21 has synchronization data 23, sector number data 25 and pre-data 27.

The synchronization data 23 is always located at a lead of the pre-information 21, and its size is one bit. A plurality of pre-information 21 are continuously arranged on the optical disc 1. They are recorded (formed) along the groove track 5 as the wobble 6. The synchronization data 23 is data indicative of a boundary between those continuously arranged pre-information 21.

The sector number data 25 is data indicative of the number of a sector (the sector number) corresponding to each pre-information 21 on the optical disc 1 in a positional condition. The sector number implies a number assigned to each of the 16 sectors constituting the ECC block 13. In the example of FIG. 3, the numbers 0 to 15 assigned to the respective sectors are the sector numbers. The size of the sector number data 25 is 4 bits.

The pre-data 27 is data indicating any one of a part of the pre-address on the optical disc 1, a part of a parity bit with regard to the pre-address, data indicative of a non-used state and the like. The size of the pre-data 27 is 8 bits.

As shown in FIG. 5, the optical disc 1 according to this embodiment employs a method of indicating one address by using 16 pre-information 21 which are continuously arranged. Moreover, the optical disc 1 according to this embodiment employs a method of making the 16 pre-information 21 correspond to the 16 sectors 11 constituting one ECC block 13.

In FIG. 5, the pre-information 21 corresponding to the sector 0 is composed of sector number data "0000" (a binary numeral) indicative of a sector number "0" and the pre-data indicative of higher 8 bits of the pre-address. The pre-information 21 corresponding to the sector 1 is composed of the sector number data "0001" indicative of a sector number "1" and the pre-data indicative of middle 8 bits of the pre-address. The pre-information 21 corresponding to the sector 2 is composed of the sector number data "0010" indicative of a sector number "2" and the pre-data indicative of lower 8 bits of the pre-address. The pre-information 21 corresponding to the sector 3 is composed of the sector number data "0011" indicative of a sector number "3" and the pre-data indicative of higher 8 bits of the parity bit with regard to the pre-address. The pre-information 21 corresponding to the sector 4 is composed of the sector number data "0100" indicative of a sector number "4" and the pre-data indicative of middle 8 bits of the parity bit with regard to the pre-address. The pre-information 21 corresponding to the sector 5 is composed of a sector number data "0101" indicative of a sector number "5" and the pre-data indicative of lower 8 bits of the parity bit with regard to the pre-address. And, the pre-information 21 corresponding to the sectors 6 to 9 are composed of sector number data indicative of sector numbers "6" to "9" and the pre-data indicative of the non-used states. By the way, the pre-data included in the sectors 10 to 15 are the data equal to the pre-data included in the sectors 0 to 5. Since the same data is repeatedly described as mentioned above, the pre-address can be surely obtained even in a case of an occurrence of the read error.

Figure 7:
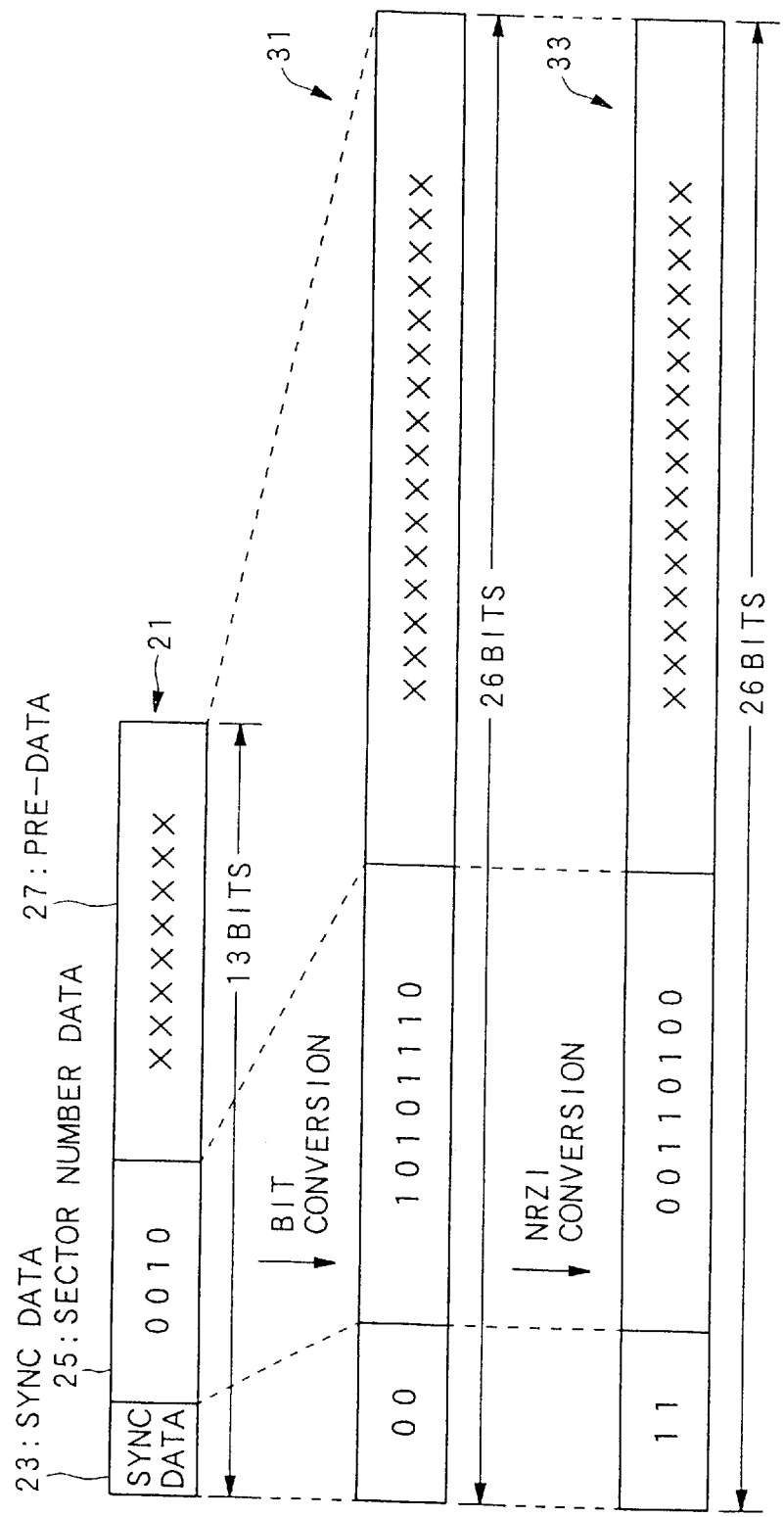
FIG. 7 is a diagram showing a conversion of the pre-information in the embodiment of the present invention.

Next, recording the pre-information 21 onto the optical disc 1 will be described below. When the pre-information 21 is recorded onto the optical disc 1 as the wobble 6, each of the bits of the pre-information 21 is converted into two-bit data, in accordance with a predetermined rule described in a bit conversion table shown in FIG. 6. When this is actually explained, the synchronization pattern (one bit) included in the pre-information 21 is converted into the two-bit data "00". Each bit constituting the pre-data and the sector number data is converted into "11" when its bit is "1", and is converted into "10" when its bit is "0". The pre-information 21 is the 13-bits data. Thus, the pre-information 21 after the conversion becomes 26-bits data, as shown in FIG. 7. Hereafter, the pre-information 21 after the conversion is referred to as "converted pre-information 31".

After the pre-information 21 is converted into the converted pre-information 31, an NRZI conversion is applied onto the converted pre-information 31, as shown in FIG. 7. Hereafter, the converted pre-information 31 after the application of the NRZI conversion is referred to as "record pre-information 33".

A first object of the application of the above-mentioned bit conversion is to easily identify the synchronization data 23 from other data (e.g., the sector number data 25 and the pre-data 27). The bit conversion converts the synchronization data 23 into "00". In the fact of the continuous two "0", this is different from any of "11" and "10" which are the conversion results of the other bits. As a result, it becomes easy to detect the synchronization pattern 23.

A second object of the application of the above-mentioned bit conversion is to limit the bit inversion interval of the record pre-information 33. The record pre-information 33 generated by applying the bit conversion onto the pre-information 21 and further applying the NRZI conversion is an RLL (Run Length Limited) code in which the longest inversion interval is limited. Actually, a maximum bit inversion interval of the record pre-information 33 is limited to 4. Incidentally, the bit inversion interval becomes 4 in the record pre-information 33 when "00" is located following "10". The maximum bit inversion interval of the record pre-information 33 corresponds to a maximum phase inversion interval of the wobble 6. Thus, the limitation of the maximum bit inversion interval of the record pre-information 33 implies the limitation of the maximum phase inversion interval of the wobble 6.

Incidentally, the NRZI conversion is done in order to reduce the noises, such as DC component and the like, which are induced in the signal corresponding to the pre-information 21, in the course of the process for recording the pre-information 21 (the record pre-information 33) onto the optical disc 1 as the wobble 6. Thus, the NRZI conversion may be omitted in the present invention, or it may be replaced by another method which can obtain the similar effect.

The record pre-information 33 generated by the bit conversion and the NRZI conversion is superimposed onto a carrier signal having a certain frequency. This superimposing of the record pre-information 33 onto the carrier signal is performed by modulating a phase of the carrier signal in accordance with the record pre-information 33. Hereafter, the signal generated by modulating the phase of the carrier signal in accordance with the record pre-information 33 is referred to as a "wobble signal Sg2".

Figure 8:
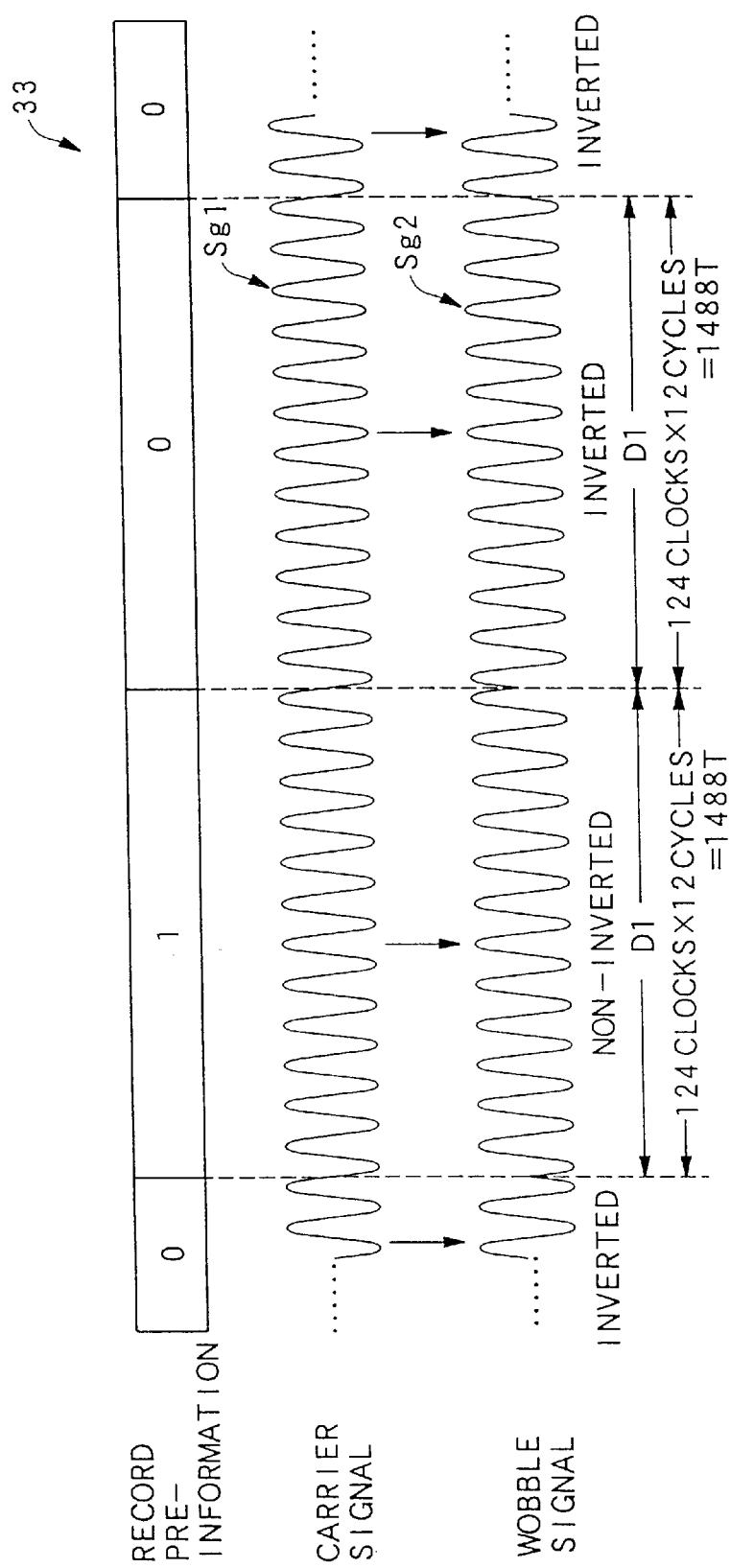
FIG. 8 is a diagram showing record pre-information, a carrier signal and a wobble signal in the embodiment of the present invention.

FIG. 8 shows the corresponding relation between a carrier signal Sg1 and the wobble signal Sg2. As shown in FIG. 8, the carrier signal Sg1 is a signal in which a phase is not changed. On the other hand, a phase of the wobble signal Sg2 is set at the same phase as the original phase of the carrier signal Sg1 when a bit constituting the record pre-information 33 is at "1". Also, when the bit constituting the record pre-information 33 is at "0", the phase of the wobble signal Sg2 is set at a phase in which the original phase of the carrier signal Sg1 is inverted (i.e., a phase in which the original phase of the carrier signal Sg1 is advanced or delayed by 180 degrees). Hereafter, the condition that the phase of the wobble signal Sg2 is equal to the original phase of the carrier signal Sg1 is referred to as a "non-inverted state", and the condition that the phase of the wobble signal Sg2 is a phase in which the original phase of the carrier signal Sg1 is inverted is referred to as an "inverted state".

The wobble 6 is formed by the meanders of the groove track 5 on the optical disc 1 in accordance with the wobble signal Sg2. As mentioned above, the record pre-information 33 is recorded onto the optical disc 1 as the change in the phase of the wobble 6. Recording of the pre-information onto the optical disc 1 (i.e., the formation of the groove track 5 having the wobble 6) is performed by the disc manufacturing apparatus 50 (FIG. 10).

Figure 9:
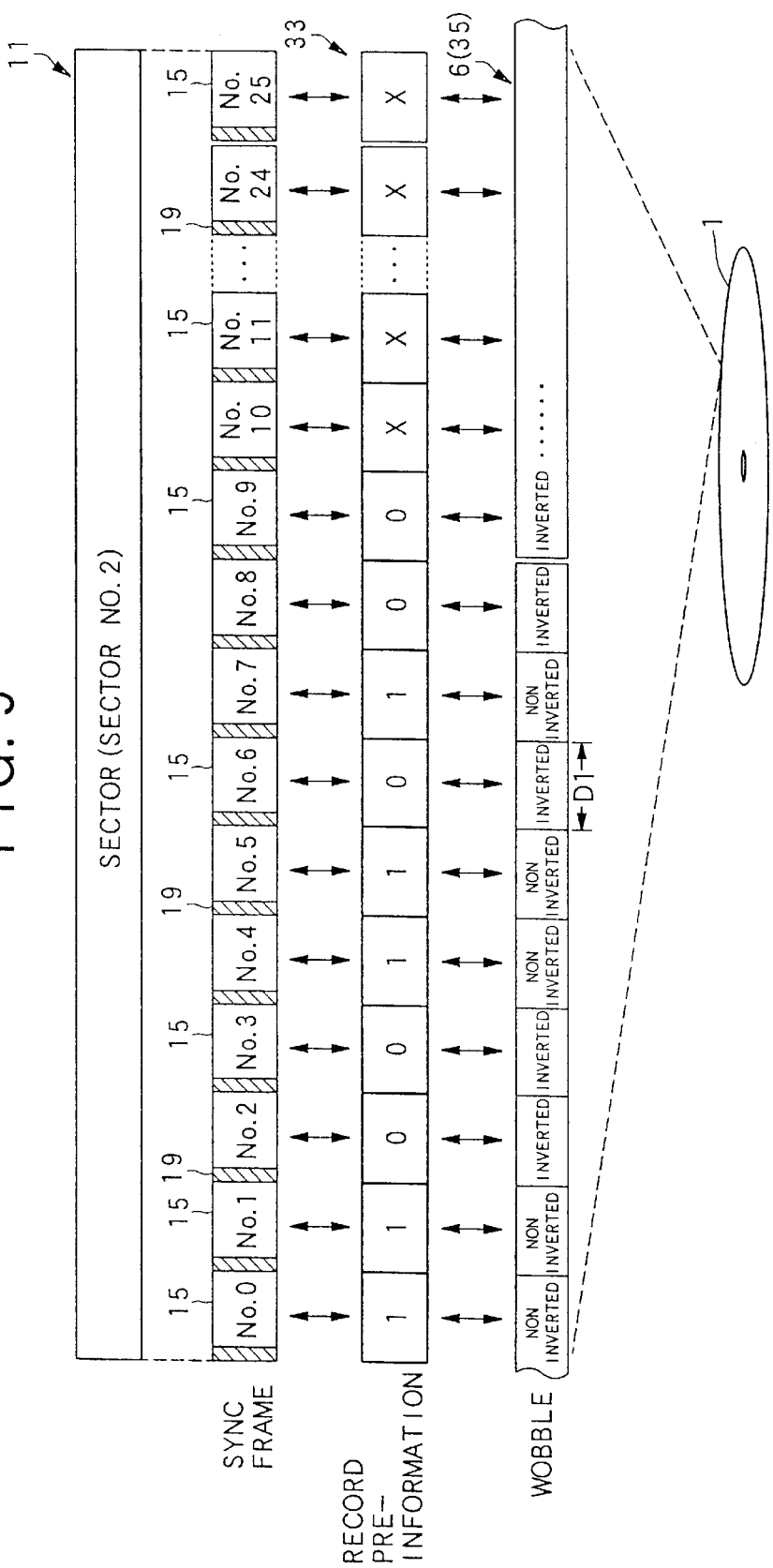
FIG. 9 is a diagram showing each corresponding relation between a sector, a synchronization frame, the record pre-information and the wobble in the embodiment of the present invention.

Next, the relation between the phase inversion interval of the wobble 6 and the arrangement interval (arrangement cycle) between the synchronization patterns 19 included in the synchronization frame 15 will be described below. FIG. 9 shows the relation between the phase inversion interval of the wobble 6 and the arrangement interval between the synchronization patterns 19. As shown in FIG. 9, in the optical disc 1 according to the embodiment of the present invention, the phase inversion interval of the wobble 6 is determined such that the phase inversion interval of the wobble 6 is equal to N times (N is an integer equal to or greater than 1) the interval between the synchronization patterns 19 (a length of one synchronization frame 15). Moreover, in the optical disc 1 according to this embodiment, a minimum phase inversion interval of the wobble 6 is equal to an interval between the synchronization patterns 19, and a position at which the phase of the wobble 6 is inverted coincides with a position at which the synchronization pattern 19 is recorded.

When this is explained in further detail, the optical disc 1 according to this embodiment employs the method of making the 16 pre-information 21 correspond to the 16 sectors 11 constituting one ECC block 13, respectively. Thus, one pre-information 21 corresponds to one sector 11. The pre-information 21 is converted into the record pre-information 33 of 26 bits, at the stage at which it is recorded on the optical disc 1. Also, one sector 11 is composed of the 26 synchronization frames 15. As mentioned above, in this embodiment, the number of bits in the record pre-information 33 corresponds to the number of synchronization frames 15 included in one sector 11 so that one bit of the record pre-information 33 corresponds to one synchronization frame 15.

As shown in FIG. 8 or FIG. 9, one bit of the record pre-information 33 corresponds to a minimum phase inversion interval D1 of the wobble 6 (wobble signal). Thus, the minimum phase inversion interval D1 of the wobble 6 becomes equal to the length of the synchronization frame 15 (1488T) modulated by the 8/16 modulation, namely, the arrangement interval between the synchronization patterns 19 on the groove track 5. Thus, the position at which the phase of the wobble 6 is inverted coincides with the position at which the synchronization pattern 19 is recorded. Hence, on the optical disc 1, the record position of the synchronization pattern 19 can be easily specified by detecting the inversion of the phase of the wobble.

Moreover, the inversion of the phase of the wobble 6, the respective bits of the record pre-information 33 and the 26 synchronization frames 15 constituting one sector correspond to each other in the positional condition, on the optical disc 1, as shown in FIG. 9. Accordingly, the sector 11 in the ECC block 13 can be easily specified by reading and decoding the record pre-information 33 and then detecting the sector number data 25 in the pre-information 21. Also, the synchronization frame 15 in the sector 11 can be easily specified by counting the number of bits in the record pre-information 33. At this time, the number of bits in the record pre-information 33 can be accurately counted since the synchronization data 23 ("00") indicative of the lead of the record pre-information 33 can be detected easily and accurately by the above-mentioned bit conversion.

Next, the setting of the cycle of the wobble 6 will be described below. In this embodiment, the cycle of the wobble 6 (wobble signal) is set at a length corresponding to a tine interval (124T) corresponding to 124 clocks of the record clock CL. Thus, since the length of each synchronization frame 15 is 1488T, a length corresponding to 12 cycles of the wobble 6 coincides with a length of one synchronization frame 15. The phase inversion of the wobbling can be accurately detected by setting the cycle of the wobbling at the length of one synchronization frame 15, namely, 1/12 of the arrangement interval between the synchronization patterns 19, as mentioned above. And, it is possible to surely read in the recorded pre-information.

As mentioned above, in the optical disc 1 according to the embodiment of the present invention, the phase inversion interval of the wobble 6 is set at N times the arrangement interval (arrangement cycle) between the synchronization patterns 19. Thus, the position on the optical disc 1 on which the synchronization pattern 19 of the record data is recorded can be specified easily and accurately only by detecting the inversion in the phase of the wobble 6. Accordingly, when the new record data is to be additionally recorded onto the optical disc 1 on which the record data is already recorded, it is possible to prevent the new record data from being overwritten onto the already recorded data without reserving a buffer region by using the dummy data and the like, as in the conventional CD-R or CD-RW. Hence, it is possible to exclude the unnecessary usage of the memory region on the optical disc 1 and thereby possible to substantially increase the memory capacity of the optical disc 1.

Also, the optical disc 1 in this embodiment is designed such that the pre-information 21 is recorded onto the optical disc 1 as the change in the phase of the wobble 6. This provides the following effect.

That is, in the conventional recordable DVD-RAM, the pre-information is recorded by the formation of the pre-pit. This results in the problem that because of the largely structural difference between the recordable DVD and the DVD dedicated to the reproduction, it is difficult to attain the compatibility between both the discs. The optical disc 1 according to the embodiment of the present invention does not require the pre-pit since the pre-information is recorded as the change in the phase of the wobble 6. Accordingly, it is possible to reduce the structural difference between the recordable disc and the disc dedicated to the reproduction, and possible to easily attain the compatibility between both the discs. For example, it is possible to jointly use and simplify the reproducing apparatus.

In this way, the optical disc 1 according to the embodiment of the present invention can solve the problems in the conventional CD-R, CD-RW and DVD, at the same time.

By the way, the case in which the minimum phase inversion interval of the wobble 6 is equal to the interval between the synchronization patterns 19 is exemplified in the optical disc 1 in the embodiment. However, the present invention is not limited to the case. The minimum phase inversion interval of the wobble 6 may be established such that it is equal to L times (L is an integer which is greater than 1 and less than N, and also a divisor of N) the interval between the synchronization patterns 19.

Also, the case in which the position of the inversion in the phase of the wobble 6 coincides with the position to which the synchronization pattern 19 is recorded. However, the present invention is not limited to the case. For example, it may be designed such that any position within the synchronization frame 15 is defined as a standard position, and the phase inversion position of the wobble 6 coincides with this standard position. Actually, it may be designed such that a middle position between a start end and a final end of the synchronization frame 15 is defined as a standard position and that the phase inversion position of the wobble 6 coincides with this standard position.

Moreover, in the optical disc 1 of the embodiment, the case is exemplified for employing the method of indicating one pre-address by using the continuously arranged 16 pieces of the pre-information 21. However, the present invention is not limited to the case.

Moreover, in the optical disc 1 of the embodiment, the case is exemplified in which the structure used in the conventional DVD is employed with regard to the structure of the record data. However, the present invention is not limited to the case.

II. Disc Manufacturing Apparatus

The disc manufacturing apparatus will be described below. FIG. 10 shows a disc manufacturing apparatus 50 according to the embodiment of the present invention. The disc manufacturing apparatus 50 shown in FIG. 10 is an apparatus for manufacturing a stamper disc serving as a mold of the optical disc 1 according to the embodiment of the present invention.

As shown in FIG. 10, the disc manufacturing apparatus 50 is provided with a pre-information generator 51, a bit converter 52, an NRZI converter 53, an oscillator 54, a phase shifter 55, a switch 56, a laser generator 57, an objective lens 58, a disc table 62, a spindle motor 63, a transfer unit 64, a position detector 65, a transfer servo circuit 66, a rotation detector 67 and a rotation servo circuit 68. The laser generator 57 has a laser generator 57A and a deflector 57B. A stamper disc 60 is placed on the disc table 62. The stamper disc 60 has a resist 60A and a glass substrate 60B.

The disc manufacturing apparatus 50 generates the wobble signal Sg2 by modulating the phase of the carrier signal Sg1 based on the record pre-information 33, and then generates on the resist 60A the land track 7 and the groove track 5 having the wobble corresponding to the wobble signal Sg2.

When this is explained in further detail, the oscillator 54 outputs the carrier signal Sg1. The carrier signal Sg1 is passed through two routes, and sent to two input terminals of the switch 56, respectively. The carrier signal Sg1 passed through one route is directly sent from the oscillator 54 to the switch 56. The carrier signal Sg1 passed through the other route is sent through the phase shifter 55 to the switch 56. The phase shifter 55 has a function of delaying or advancing the phase of the carrier signal Sg1 by 180 degrees. Thus, the carrier signal Sg1 and a signal in which the phase of the carrier signal Sg1 is inverted are sent to the switch 56, at the same time.

On the other hand, the pre-information generator 51 outputs the pre-information 21. The pre-information 21 is converted into the converted pre-information 31 by the bit converter 52. In succession, it is converted into the record pre-information 33 by the NRZI converter 53 (refer to FIG. 7) and is then sent to a control terminal of the switch 56.

The switch 56 permits the pass of the signal, in which the phase of the carrier signal Sg1 is inverted, when a bit of the record pre-information 33 is at "0", and permits the pass of the carrier signal Sg1 when the bit of the record pre-information 33 is at "1". Thus, the wobble signal Sg2 is generated in which the phase is inverted on the basis of the bit state of the record pre-information 33 (refer to FIG. 8 and FIG. 9).

The wobble signal Sg2 is sent from the switch 56 to the deflector 57B of the laser generator 57. The deflector 57B slightly deflects an optical axis of a laser beam generated by the laser generator 57A, in accordance with the wobble signal Sg2. As a result, a spot position of the laser beam, which is emitted from the laser generator 57 through the objective lens 58 to the resist 60A of the stamper disc 60, is modulated in a radius direction, in accordance with the wobble signal Sg2.

At this time, the stamper disc 60 is rotated by the spindle motor 63. A rotation number of the stamper disc 60 is controlled by the rotation detector 67 and the rotation servo 68 so that it is rotated at a predetermined speed. Moreover, when the laser beam is emitted, the stamper disc 60 is moved in its radius direction at a predetermined speed. This movement is controlled by the position detector 65 and the transfer servo 66.

Since such operations are integrally carried out, the land track 7 and the groove track 5 having the wobbling are formed spirally or concentrically on the stamper disc 60. When the optical disc 1 is manufactured, the stamper disc 60 is used as the mold of the optical disc 1.

III. Recording/Reproducing Apparatus

The recording/reproducing apparatus will be described below. FIG. 11 shows the recording/reproducing apparatus 70 according to the embodiment of the present invention. The recording/reproducing apparatus 70 has a function of recording the record data onto the optical disc 1 and a function of reproducing the record data recorded on the optical disc 1.

As shown in FIG. 11, the recording/reproducing apparatus 70 is provided with a spindle motor 71, an optical pickup 73, an amplifier 75, a decoder 77, a signal detector 79, a pre-address decoder 81, a CPU 83, a servo circuit 85, an encoder 87 and a laser driving circuit 89.

When the record data is recorded onto the optical disc 1, the recording/reproducing apparatus 70 reads in the pre-information 21 and the like from the wobble 6 formed on the optical disc 1. Then, the recording/reproducing apparatus 70 records the record data onto the optical disc, while controlling the rotation speed of the optical disc 1 and specifying the position on the optical disc 1, in accordance with those read information Such a recording operation will be described below in further detail. At first, the spindle motor 71 rotates the optical disc 1 at a predetermined initial rotation speed. The optical pickup 73 emits a light beam for a reading operation, onto the rotating optical disc 1, and receives its reflection light, and then outputs a read signal Sg3 corresponding to the received reflection light. This read signal Sg3 includes a wobble signal component indicative of the wobble 6. The light beam for the reading operation implies a light beam in which its strength is weaker that that of a light beam for a recording operation, and the strength is constant.

The read signal Sg3 is sent from the optical pickup 73 to the amplifier 75, and is amplified by the amplifier 75, and is then sent to the signal detector 79. The signal detector 79 detects the wobble signal component from the read signal Sg3, and outputs it as a wobble detection signal Sg4 to the pre-address decoder 81. This wobble detection signal Sg4 is a signal substantially equal to the wobble signal Sg2 (FIG. 10), and includes the pre-information 21.

The pre-address decoder 81 generates a record clock CL synchronous with the wobble detection signal Sg4, demodulates the pre-information 21 based on the wobble detection signal Sg4, and generates a count value to repeat an initialization and a count at a predetermined cycle determined by the wobble detection signal Sg4.

The record clock CL is sent to the encoder 87, and is used to determine a time interval of one bit of the record data in a modulating process of the record data in the encoder 87. The demodulated pre-information 21 is sent to the CPU 83 as a demodulation signal Sg5, and is used to specify the position on the optical disc 1, in the CPU 83. The count value is sent to the servo circuit 85 and the CPU 83 as a counter signal Sg6. The counter signal Sg6 is used to specify the position on the optical disc 1, in the CPU 83. It is used as the information to control the rotation of the optical disc 1, in the servo circuit 85.

The servo circuit 85 carries out a drive control of the spindle motor 71 and the like, in accordance with the counter signal Sg6 and the like.

During the generations of the record clock CL and the counter value, the demodulation of the pre-information 21 and the rotation control of the optical disc 1, the CPU 83 receives the record data from the external portion, and sends it as the record data RD to the encoder 87.

The encoder 87 applies the 8/16 modulation, the NRZI conversion and the like onto the record data RD. At this time, a time interval of one bit in the record data RD is determined in accordance with the record clock CL sent by the pre-address decoder 81. The laser driving circuit 89 converts the record data RD outputted by the encoder 87, into a control signal Sg7 for controlling the light beam, sends it to the optical pickup 73.

Simultaneously with this operation, the CPU 83 specifies the position on the optical disc 1 at which the record data RD is to be recorded, in accordance with the demodulation signal Sg5 and the counter signal Sg6. At this time, the CPU 83 decodes the pre-information 21 from the demodulation signal Sg5, and extracts the pre-address from the pre-information 21. Then, the CPU 83 specifies the position on the optical disc 1 at a unit of the ECC block, in accordance with this pre-address. Moreover, the CPU 83 extracts the sector number data 25 from the decoded pre-information 21, and specifies the position on the optical disc 1 at a sector unit, in accordance with this extraction. Moreover, the CPU 83 obtains the record pre-information 33 from the demodulation signal Sg5, and counts the number of bits in this record pre-information 33, and thereby specifies the position on the optical disc 1 at a unit of the synchronization frame 15.

After specifying the position on the optical disc 1 at which the record data RD is to be recorded, in order that the record data RD is recorded from the position, the CPU 83 moves the optical pickup 73 in the radius direction of the optical disc 1, and performs positioning. The movement control of the optical pickup 73 is done substantially similar to that of the conventional DVD recording apparatus.

The optical pickup 73 outputs the light beam whose strength is changed on the basis of the record data RD (the light beam for the recording operation) towards the specified position on the optical disc 1. Accordingly, the record data RD is recorded as the pit row on the groove track 5 of the optical disc 1.

On the other hand, when the record data already recorded on the optical disc 1 is reproduced, the recording/reproducing apparatus 70 is operated as described below. The optical pickup 73 emits the light beam for the reading operation, to the rotated optical disc 1, and receives its reflection light, and then outputs the read signal Sg3 corresponding to the received reflection light. This read signal Sg3 includes a component of the wobble signal and a component indicative of the record data recorded on the optical disc 1.

The read signal Sg3 is amplified by the amplifier 75, and is then sent to the decoder 77. The decoder 77 extracts only the component indicative of the record data from the read signal Sg3, and performs a demodulating process on it. Moreover, the decoder 77 sends the demodulated record data as the reproduction data PD to the CPU 83. Then, the reproduction data PD is outputted from the CPU 83 to an external portion.

The demodulation of the pre-information 21 and the generations of the count value and the record clock CL based on the wobble signal component are done substantially similar to those of the recording operation, at the time of the reproducing operation. Then, the control of the rotation speed of the optical disc 1 and the like are done by the servo circuit 85, in accordance with the counter signal Sg6 sent by the pre-address decoder 81. The information for controlling the rotation speed of the optical disc 1 and the like can be detected from the record data read from the optical disc 1. Thus, it may be designed such that the decoder 77 generates a rotation control signal Sg9 including the information for controlling the rotation speed of the optical disc 1 and then sends it to the servo circuit 85 to thereby carry out the rotation control of the optical disc 1.

Then, the pre-address decoder 81 will be described below in further detail. The pre-address decoder 81 generates a record clock CL synchronous with the wobble detection signal Sg4, and also detects whether a phase of the wobble detection signal Sg4 is in the non-inverted state or the inverted state, and then generates the demodulation signal Sg5. In order to attain it, in the embodiment of the present invention, a Costas loop method is employed which is typically known as a PSK (Phase Shift keying) demodulation technique.

Figure 12:
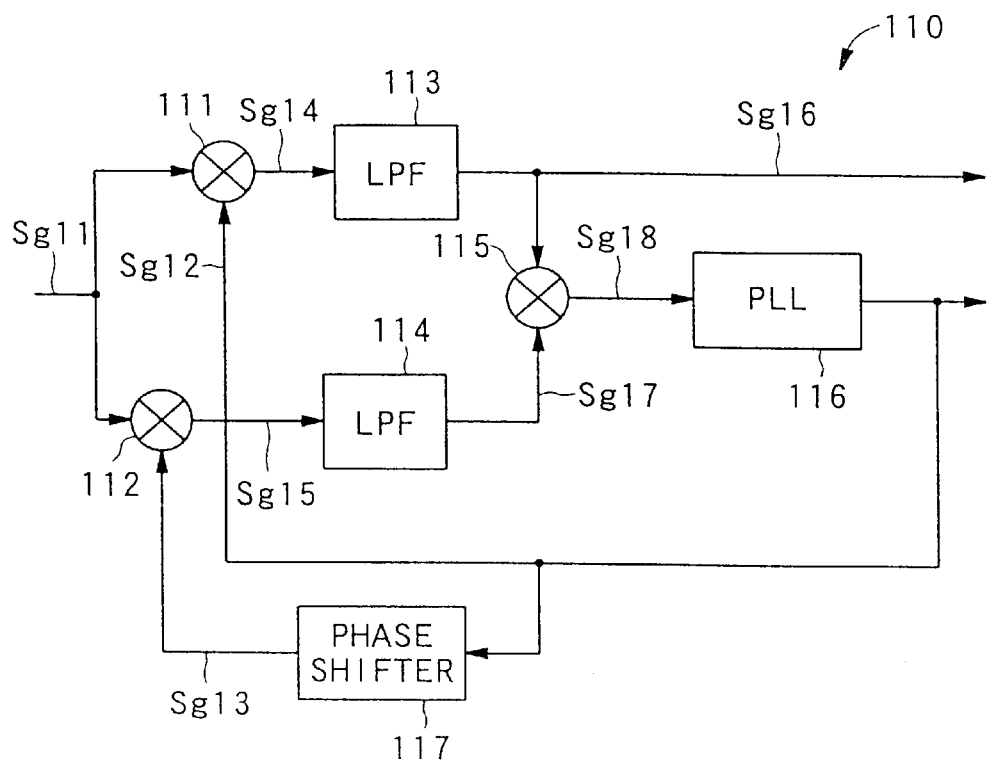
FIG. 12 is a block diagram showing a basic circuit for attaining a PSK demodulation in the embodiment.

Here, the PSK demodulation using the Costas loop method is described with reference to FIG. 12. FIG. 12 shows a basic circuit to attain the PSK demodulation using the Costas loop method. As shown in FIG. 12, this basic circuit 110 is designed such that a synchronous detection (multiplication) of an input signal Sg11 is performed by using a carrier signal Sg12 generated by a PLL circuit 116 and a carrier signal Sg13 orthogonal to (out of phase by 90 degrees from) the carrier signal Sg12.

The operations of the basic circuit 110 will be described below. At first, it is assumed that an input signal Sg11 represented by the following equation (1) is inputted to the basic circuit 110, and the carrier signal Sg12 is out of phase by $\phi$ with respect to the input signal Sg11.

$$Sg11 = \pm \sin(w_c t) \qquad (1)$$

The carrier signal Sg12 outputted by the PLL circuit 116 is branched into two elements. One of the elements is directly sent to a multiplier 111. The other of the elements is shifted in phase by 90 degrees by a phase shifter 117, and is then sent as the carrier signal Sg13 to a multiplier 112. As a result, a multiplication signal Sg14 represented by the following equation (2) is generated by the multiplier 111.

$$\begin{aligned} Sg14 &= \pm \sin(w_c t) \times \sin(w_c t + \phi) \\ &= \pm 1/2[\cos(2w_c t + \phi) - \cos(-\phi)] \end{aligned} \qquad (2)$$

Also, a multiplication signal Sg15 represented by the following equation (3) is generated by the multiplier 112.

$$\begin{aligned} Sg15 &= \pm \sin(w_c t) \times \cos(w_c t + \phi) \\ &= \pm 1/2[\sin(2w_c t + \phi) + \sin(-\phi)] \end{aligned} \qquad (3)$$

Those multiplication signals Sg14 and S15 are inputted to low pass filters (LPF) 113 and 114, respectively. Then, the low pass filters 113 and 114 remove the components of the $2w_c t$ in the equations 2 and 3 from the multiplication signals Sg14 and Sg15, respectively. Moreover, a multiplier 115 multiplies respective output signals Sg16 and Sg17 respectively from the low pass filters 113 and 114 by each other. This results in the generation of a phase error signal Sg18 represented by the following equation (4).

$$Sg18 = [\pm \frac{1}{2} \cos(-\phi)] \times [\pm \frac{1}{2} \sin(-\phi)] = \frac{1}{8} \sin(-2\phi) \qquad (4)$$

Irrespectively of the non-inverted state or the inverted state of the phase of the input signal Sg11, this phase error signal Sg18 is negative when the phase deflection $\phi$ is positive (i.e., when the phase of the carrier signal Sg12 is advanced), is zero when the phase deflection $\phi$ is zero, and is positive when the phase deflection $\phi$ is negative (i.e., when the phase of the carrier signal Sg12 is delayed).

The PLL circuit 116 controls the phase of the carrier signal Sg12 so that it coincides with that of the input signal Sg11, based on the phase error signal Sg18.

Moreover, when the phase deflection $\phi$ is controlled at zero, an output signal Sg16 generated by inputting the multiplication signal Sg14 represented by the equation (2) to the low pass filter 113 becomes positive when the phase of the input signal Sg11 is in the non-inverted state ($\sin(\omega t)$), and becomes positive when the phase of the input signal Sg11 is in the inverted state ($-\sin(\omega t)$). Thus, whether the phase of the input signal Sg11 is in the non-inverted state or the inverted state can be recognized by identifying whether the value of the output signal Sg16 is positive or negative.

Figure 13:
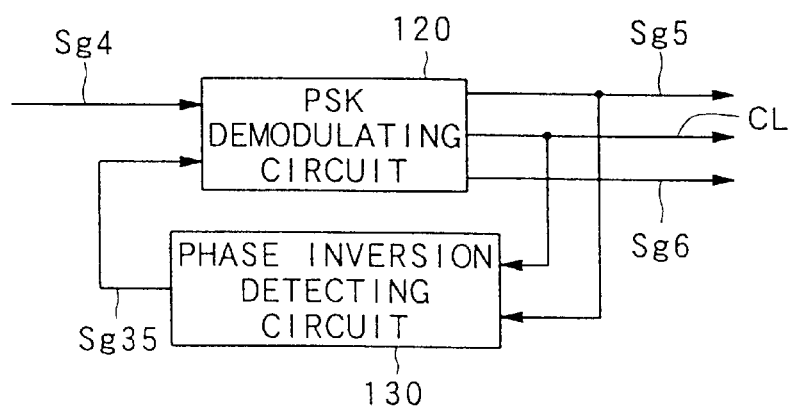
FIG. 13 is a block diagram showing a pre-address decoder in the embodiment of the present invention.

FIG. 13 shows the inner structure of the pre-address decoder 81 according to the embodiment of the present invention. As shown in FIG. 13, it is provided with a PSK demodulating circuit 120 and a phase inversion detecting circuit 130.

Figure 14:
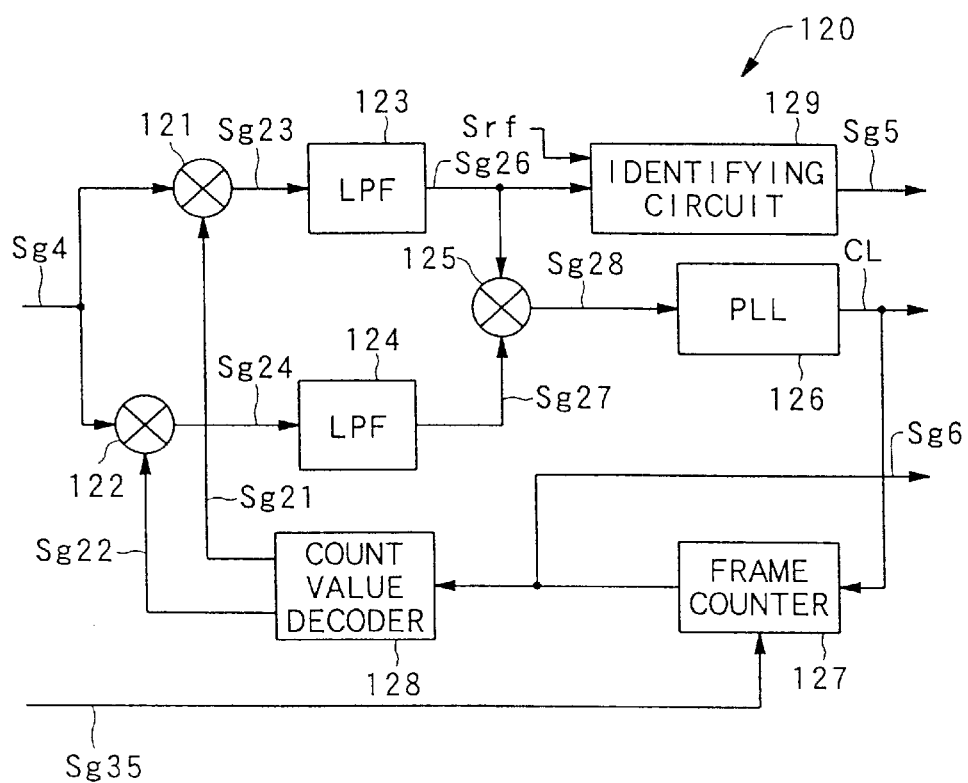
FIG. 14 is a block diagram showing a PSK demodulating circuit in the embodiment of the present invention.

FIG. 14 shows the inner structure of the PSK demodulating circuit 120. As shown in FIG. 14, the PSK demodulating circuit 120 according to the embodiment of the present invention is a circuit having in a part thereof the configuration of the basic circuit 110. The PSK demodulating circuit 120 is provided with three multipliers 121, 122 and 125, two low pass filters 123 and 124, a PLL circuit 126, a frame counter 127, a counter value decoder 128 and an identifying circuit 129.

The multipliers 121, 122 and 125 and the low pass filters 123 and 124 have the structures substantially similar to those of the multipliers 111, 112 and 115, and the low pass filters 113 and 114 of the basic circuit 110, respectively.

The PLL circuit 126 is a circuit for generating the record clock CL. It is a circuit for controlling the phase of the record clock CL based on the value of a phase error signal Sg28 so that the phase of the record clock CL coincides with that of the wobble detection signal Sg4 (input signal).

The frame counter 127 is a circuit for counting the clocks of the record clock CL sent by the PLL circuit 126 and outputting its count value. Also, the frame counter 127 initializes the count value to zero when a reset signal Sg35 sent by the phase inversion detecting circuit 130 becomes at a high level.

The counter value decoder 128 is a circuit which in accordance with the counter value outputted by the frame counter 127, generates a pulse signal Sg21 to be used for the synchronous detection of the wobble detection signal Sg4 and a pulse signal Sg22 which is out of phase by 90 degrees from the pulse signal Sg21.

The identifying circuit 129 is a circuit for demodulating the pre-information 21 in accordance with an output signal Sg26 from the low pass filter 123.

FIG. 15 shows the operations of the PSK demodulating circuit 120. The operations of the PSK demodulating circuit 120 will be described below with reference to FIG. 14 and FIG. 15.

When a wobble detection signal Sg4 is inputted from the signal detector 79 to the pre-address decoder 81 (refer to FIG. 11), this wobble detection signal Sg4 is inputted to the PSK demodulating circuit 120. At this time, the PLL circuit 126 outputs the record clock CL having a clock cycle corresponding to a time interval of one bit in the record data, to the frame counter 127.

The frame counter 127 counts the record clock CL. The reset signal Sg35 is sent from the phase inversion detecting circuit 130 to the frame counter 127. The reset signal Sg35 becomes at the high level each time the number of clocks of the record clock CL reaches 1488, as shown in FIG. 15. That is, an interval when the reset signal Sg35 becomes at the high level coincides with the length of the synchronization frame 15 (the minimum phase inversion cycle D1 of the wobble 6). Thus, each time the number of clocks of the record clock CL reaches 1488, the frame counter 127 repeats the operation for counting the record clock CL while initializing the counter value to zero. A triangular wave form shown in FIG. 15 indicates the condition that the initialization and the count of the counter value are repeated. Here, the counter value counts the clock pulses of the record clock CL. Hence, a cycle when the counter value is increased by 1 is equal to the clock cycle of the record clock CL.

The counter value of the frame counter 127 is sent to the counter value decoder 128. The counter value decoder 128 generates the pulse signals Sg21 and Sg22 to be used for the synchronous detection of the wobble detection signal Sg4.

As shown in FIG. 15, the cycle of the pulse signal Sg21 is equal to that of the wobble detection signal Sg4. When it is assumed that there is no phase deflection between the record clock CL and the wobble detection signal Sg4, the phase of the pulse signal Sg21 coincides with that of the wobble detection signal Sg4. In this embodiment, as mentioned above, the cycle of the wobble 6 is set at the length corresponding to the time interval corresponding to the 124 clocks of the record clock CL. The length of the synchronization frame 15, namely, the minimum phase inversion interval D1 of the wobble 6 (refer to FIGS. 8 and 9) corresponds to the time interval (1488T) corresponding to the 1488 clocks of the record clock CL. Thus, $\frac{1}{12}$ of the length of the synchronization frame 15 is equal to the wobble cycle. This implies that the wobble cycle is a divisor of the length of the synchronization frame (1/M: M is an integer equal to or greater than 2). In this way, if the wobble cycle is the divisor of the length of the synchronization frame, the wobble cycle can be obtained by merely dividing the number of clocks corresponding to the length of the synchronization frame by M. Accordingly, the counter value decoder 128 can easily generate the pulse signal Sg21 whose frequency and phase are equal to those of the wobble detection signal Sg4, in accordance with the change of the counter value.

Moreover, as shown in FIG. 15, the pulse signal Sg22 is a signal in which its frequency is identical to that of the pulse signal Sg21 and its phase is deviated by 90 degrees (¼ cycle) from that of the wobble signal Sg21. In this embodiment, the cycle of the wobble 6 is set at the length corresponding to the time interval corresponding to the 124 clocks of the record clock CL. 124 is a multiple of 4. This implies that the cycle of the wobble 6 is equal to 4 P times (P is an integer equal to or greater than 1) the clock cycle of the record clock CL. For this reason, the counter value decoder 128 can easily generate the pulse signal Sg22 which is deviated by the ¼ cycle from the pulse signal Sg21.

The pulse signals Sg21 and Sg22 are outputted to the multipliers 121 and 122, respectively. The multiplier 121 multiplies the pulse signal Sg21 and the wobble detection signal Sg4 by each other, and outputs a multiplication signal Sg23. On the other hand, the multiplier 122 multiplies the pulse signal Sg22 and the wobble detection signal Sg4 by each other, and outputs a multiplication signal Sg24. The multiplication signals Sg23 and Sg24 have the wave forms shown in FIG. 15.

The multiplication signals Sg23 and Sg24 are passed through the low pass filters 123 and 124, respectively, then multiplied by each other, and sent as the phase error signal Sg28 to the PLL circuit 126. Accordingly, the PLL circuit 126 carries out a control so that the phase of the record clock CL coincides with that of the wobble detection signal Sg4 (input signal).

Moreover, the output signal Sg26 of the low pass filter 123 has the wave form shown in FIG. 15. When the wobble detection signal Sg4 in FIG. 15 is compared with the output signal Sg26, it is understood that if the value of the output signal Sg26 is positive, the phase of the wobble detection signal Sg4 is in the non-inverted state, and if the value of the output signal Sg26 is negative, the phase of the wobble detection signal Sg4 is in the inverted state. This output signal Sg26 is sent to the identifying circuit 129. At this time, the component $2w_c t$ can be removed in the low pass filter having the simple configuration by setting M at a large value (M=12, in this embodiment).

The identifying circuit 129 compares the output signal Sg26 with a standard signal Srf having a predetermined level (for example, a zero level), and generates a demodulation signal Sg5 shown in FIG. 15. The demodulation signal Sg5 is a pulse signal in which its value is changed depending on whether the wobble detection signal Sg4 is in the non-inverted state or the inverted state. This implies that the demodulation signal Sg5 is a signal indicative of the pre-information 21.

Moreover, the record clock CL generated by the PLL circuit 126 is sent to the encoder 87, and the demodulation signal Sg5 outputted by the identifying circuit 129 is sent to the CPU 83, respectively. Moreover, the counter value outputted by the frame counter 127 is sent as the counter signal Sg6 to the CPU 83 and the servo circuit 85.

FIG. 16 shows the inner structure of the phase inversion detecting circuit 130. The phase inversion detecting circuit 130 is a circuit for generating the reset signal Sg35 to reset the counter value of the frame counter 127.

As shown in FIG. 15, the reset signal Sg35 is a signal which becomes at the high level each time the number of clocks of the record clock CL reaches 1488 and in which an interval when it becomes at the high level coincides with the length of the synchronization frame 15 (the minimum phase inversion cycle D1 of the wobble 6). The phase inversion detecting circuit 130 determines a timing when this reset signal Sg35 becomes at the high level, in accordance with a rising edge and a trailing edge of the demodulation signal Sg5 outputted by the identifying circuit 129 in the PSK demodulating circuit 120.

Here, the wobble 6 formed in the groove track 5 has a small amplitude in order to curb as much as possible the influence on the operation for reading the record data. For example, the amplitude of the wobble 6 is several % of a track pitch. This results in a small S/N ratio of the wobble detection signal Sg4. There may be a case that the timings of the rising edge and the trailing edge of the demodulation signal Sg5 are unstable because of the influence of noise. So, the phase inversion detecting circuit 130 averages the timings of the rising edges or the trailing edges of the demodulation signal Sg5, and determines the timing when the reset signal Sg35 becomes at the high level, by using the averaged timing. Thus, the accuracy of the timing can be made higher when the reset signal Sg35 becomes at the high level.

As shown in FIG. 16, the phase inversion detecting circuit 130 is provided with an edge detecting circuit 131, a counter 133, a hold circuit 135, a low pass filter (LPF) 137 and a comparing circuit 139.

Figure 17:
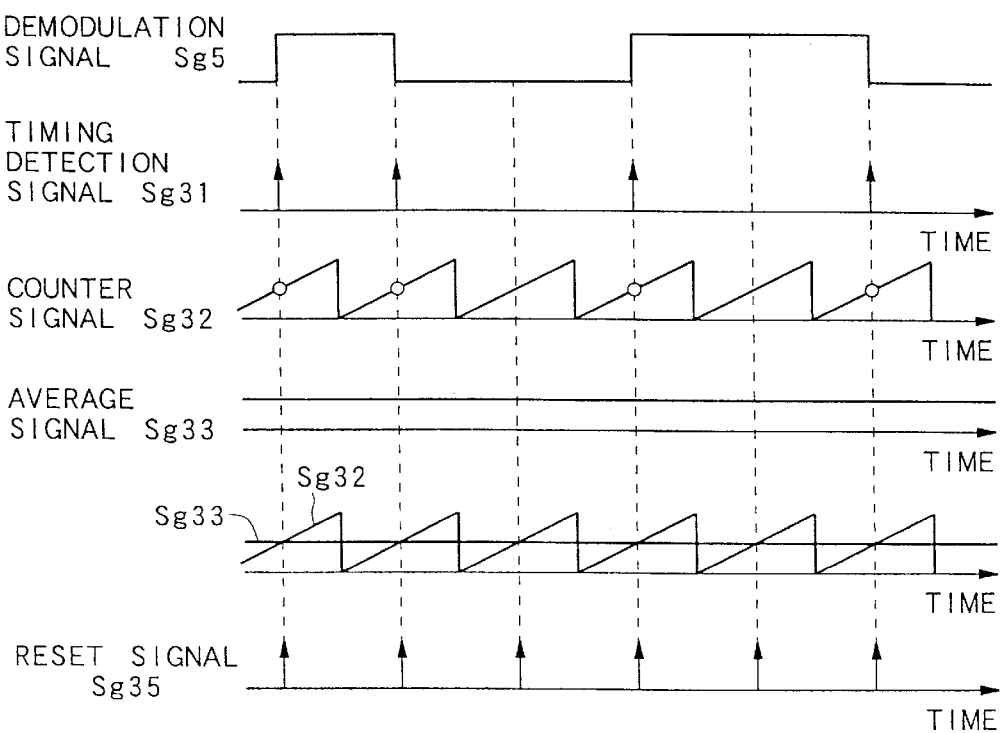
FIG. 17 is a wave form diagram showing a signal wave form illustrating an operation of the phase detecting circuit shown in FIG. 16.

FIG. 17 shows the operations of the phase inversion detecting circuit 130. The operations of the phase inversion detecting circuit 130 will be described below with reference to FIG. 16 and FIG. 17.

The demodulation signal Sg5 outputted by the identifying circuit 129 in the PSK demodulating circuit 120 is inputted to the edge detecting circuit 131. The edge detecting circuit 131 detects the rising edge and the trailing edge of the demodulation signal Sg5. Then, the edge detecting circuit 131 outputs a timing detection signal Sg31 to the hold circuit 135, at a timing when the rising edge or the trailing edge of the demodulation signal Sg5 is detected.

On the other hand, the record clock CL generated by the PLL circuit 126 in the PSK demodulating circuit 120 is inputted to the counter 133. The counter 133 counts the number of clocks of the record clock CL. It is initialized when its count value reaches 1488. After that, the counting operation and the initialization are repeated. The counter value of the counter 133 is outputted as a counter signal Sg32 to the hold circuit 135.

The hold circuit 135 stores therein the counter value of the counter 133, at the timing of the input of the timing detection signal Sg31, namely, at the timing of the detection of the rising edge or the trailing edge of the demodulation signal Sg5, and holds the value until an input of a next timing detection signal Sg31. The hold circuit 135 repeats such operations each time the timing detection signal Sg31 is inputted.

The counter values held by the hold circuit 135 are outputted to the low pass filter 137, and are averaged by the low pass filter 137.

The comparing circuit 139 compares the averaged counter value (an average signal Sg33) with a counter value (a counter signal Sg32) directly received from the counter 133, and outputs a pulse signal which becomes at the high level at a timing when both the counter values coincide with each other. This pulse signal is sent to the frame counter 127 in the PSK demodulating circuit 120 as the reset signal Sg35

If the rising timing or the trailing timing of the demodulation signal Sg5 is deviated because of the influence of the noise, the output timing of the timing detection signal Sg31 is changed (the timing when the timing detection signal Sg31 becomes at the high level), which causes the counter value stored and held by the hold circuit 135 to be varied depending on the change in the output timing of the timing detection signal Sg31. However, since the counter values are averaged by the low pass filter 137, such variation of the counter value is removed, which enables the accurate determination of the timing when the reset signal Sg35 becomes at the high level.

Figure 18:
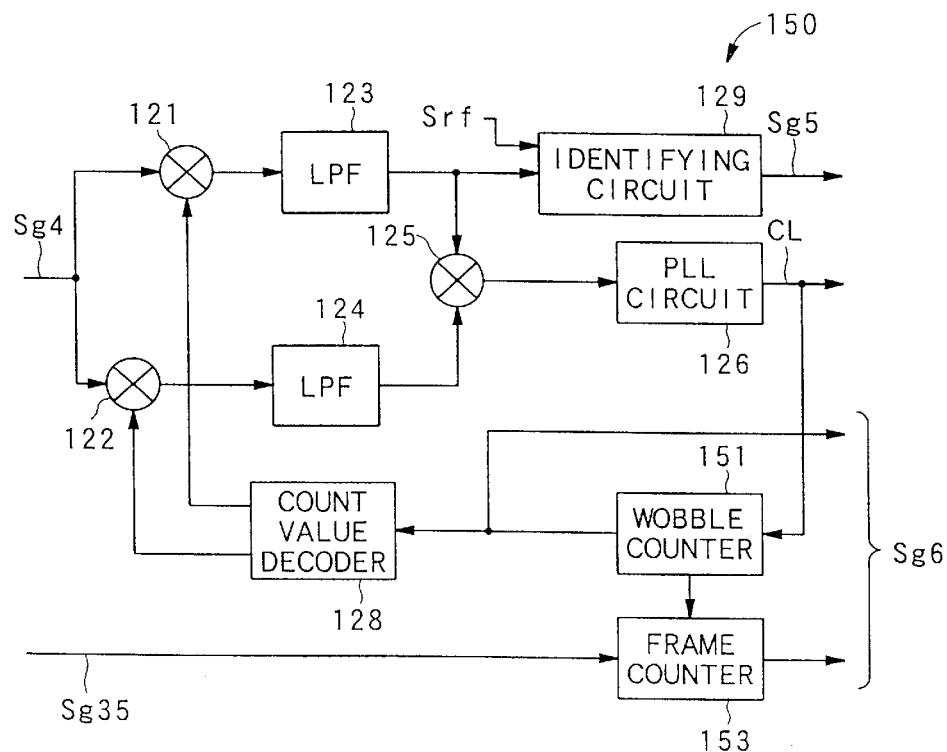
FIG. 18 is a block diagram showing a PSK demodulating circuit according to another embodiment of the present invention.

FIG. 18 shows another embodiment of the PSK demodulating circuit. The above described PSK demodulating circuit 120 (FIG. 14) is designed so as to use the single low pass filter 137. However, as shown in a PSK demodulating circuit 150 in FIG. 18, it may be designed so as to mount a first counter 151 for counting the cycles of the wobble 6 and a second counter 153 for counting the number of times at which the wave form corresponding to the wobble 6 is oscillated within one synchronization frame 15. Incidentally, the number of times when the wave form corresponding to the wobble 6 is oscillated within the one synchronization frame 15 is 12 if the wobble cycle is 124 clocks and the length of the one synchronization frame is 1488 clocks.

Figure 19:
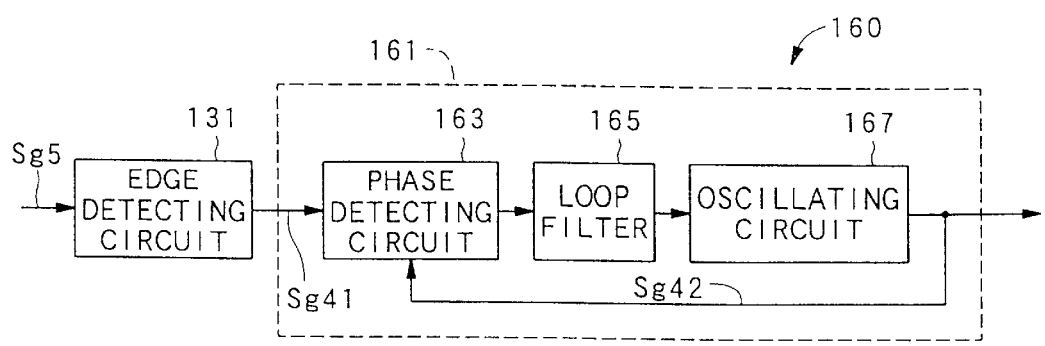
FIG. 19 is a block diagram showing a phase detecting circuit in another embodiment of the present invention.

FIG. 19 shows another embodiment of the phase detecting circuit. The phase inversion detecting circuit 130 (FIG. 16) has the configuration in which the rising timings or the trailing timings of the demodulation signal Sg5 are averaged by using the low pass filter 137 and accordingly the reset signal Sg35 is generated. However, as shown in a phase detecting circuit 160 in FIG. 19, it may be designed so as to use a PLL circuit 161 and accordingly generate a reset signal Sg35.

The phase detecting circuit 160 is designed such that the PLL circuit 161 synchronizes the rising timing or the trailing timing of the demodulation signal Sg5 with the timing when the reset signal Sg35 becomes at the high level. As the PLL circuit 161, it may use a PLL circuit having a typical configuration having a phase detecting circuit 163, a loop filter 165 and an oscillating circuit 167, as shown in FIG. 18. Even if the rising timing or the trailing timing of the demodulation signal Sg5 is deviated because of the influence of the noise, it is possible to generate the stable reset signal Sg35 which does not suffer from the deviation, by setting a control band of the PLL circuit 161, for example, at about 100 Hz to 1 kHz.

Figure 20:
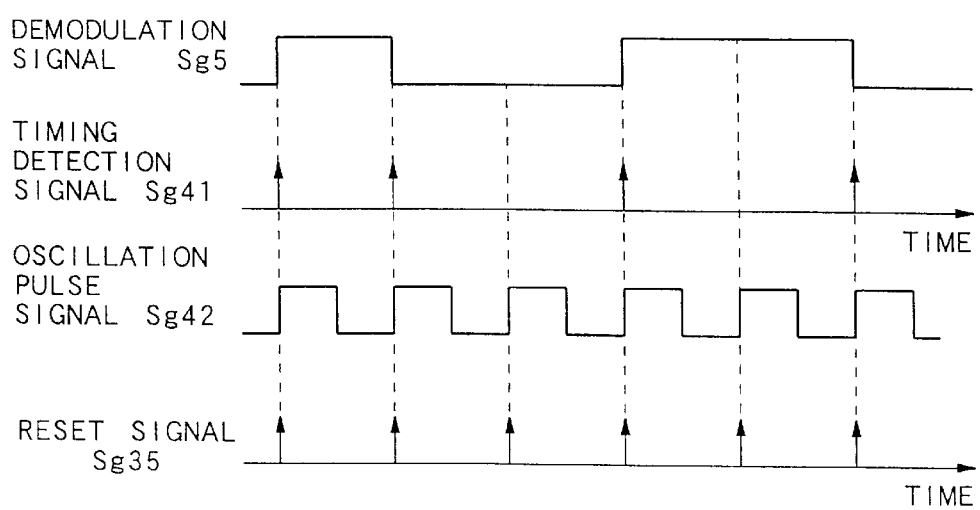
FIG. 20 is a wave form view showing a signal wave form illustrating an operation of the phase detecting circuit shown in FIG. 19.

FIG. 20 shows the operations of the phase detecting circuit 160. As shown in FIG. 20, the edge detecting circuit 131 detects the rising timing and the trailing timing of the demodulation signal Sg5, and outputs a timing detection signal Sg41 indicative of each timing to the PLL circuit 161. Accordingly, an oscillation pulse signal Sg42 synchronous with the timing detection signal Sg41 is obtained from the oscillating circuit 167. The rising timing of the oscillation pulse signal Sg42 can be used as the timing when the reset signal Sg35 becomes at the high level.

As mentioned above, in the recording/reproducing apparatus 70 according to the embodiment of the present invention, the pre-information 21 can be demodulated by detecting the inversion in the phase of the wobble 6. Thus, the position on the optical disc 1 can be specified easily and accurately based on the pre-information.

Also, this is designed so as to generate the counter value (the counter signal Sg6) to repeat the initialization and the counting operation, in synchronization with the length of the synchronization frame 15 (the minimum phase inversion interval D1 of the wobble 6) when the pre-information 21 is demodulated to generate the demodulation signal Sg5. Thus, it is possible to use this counter value to thereby specify the position on the optical disc 1 at the high accuracy.

Moreover, this is designed so as to average the rising timings or the trailing timings of the demodulation signal Sg5 when determining the timing of the initialization of the counter value (counter signal Sg6), namely, the timing when the reset signal Sg35 becomes at the high level. Thus, it is possible to accurately determine the timing of the initialization of the counter value (counter signal Sg6). Hence, the position on the optical disc 1 can be accurately specified through the counter value (counter signal Sg6).

Moreover, since the Costas loop method is applied to the PSK demodulating circuit 120 (150), the synchronous detection can be performed on the wobble detection signal Sg4 easily and accurately, which also contributes to the improvement of the accuracy in specifying the position on the optical disc 1.

In this way, the recording/reproducing apparatus 70 according to the embodiment of the present invention can specify the position on the optical disc 1 easily and accurately. Also, it can prevent the new record data from being overwritten onto the already recorded data, without reserving the buffer region by using the dummy data and the like, such as the conventional CD-R or CD-RW, when the new record data is additionally recorded onto the optical disc 1 on which the record data is already recorded. Thus, it is possible to exclude the unnecessary usage of the memory region on the optical disc 1, and also possible to substantially increase the memory capacity of the optical disc 1.

In the PSK demodulating circuit 120 (150), the case is exemplified in which the multipliers 121 and 122 are used for the synchronous detection of the wobble detection signal Sg4. However, the present invention is not limited to the case. The multipliers 121 and 122 may be replaced by polarity inverting circuits, respectively. Thus, it is possible to simplify the configuration of the PSK demodulating circuit 120 (150).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-293814 filed on Oct. 15, 1999 including the specification, claims, drawings and summary is incorporated herein by reference in its entirety.

What is claimed is:

1. An information record disc comprising:

a track formed on a disc surface, on which record information to be reproduced is recorded or to be recorded; and a wobble formed on said track such that a phase of said wobble is changed at a plurality of locations on said track and that positional information indicative of a position on said disc surface is recorded with an arrangement of wobble-groups each of which includes a plurality of said wobbles each having an identical phase, wherein said record information includes a synchronization signal, which is arranged at a predetermined interval, to attain a synchronization when said record information is recorded or reproduced, and an interval of beginning positions of said wobble-groups on said track is equal to N times (N is an integer equal to or greater than 1) of the predetermined interval of said synchronization signal when said record information is recorded on said track.

2. An information record disc according to claim 1, wherein said synchronization signal in said record information is placed at said beginning position of said wobble-group when said record information is recorded on said track.

3. An information recording apparatus for recording record information to be reproduced onto an information record disc comprising:

a track formed on a disc surface, on which the record information is recorded or to be recorded;

and a wobble formed on said track such that a phase of said wobble is changed at a plurality of locations on said track and that positional information indicative of a position on said disc surface is recorded with an arrangement of wobble-groups each of which includes a plurality of said wobbles each having an identical phase, wherein said record information includes a synchronization signal, which is arranged at a predetermined interval, to attain a synchronization when said record information is recorded or reproduced, and an interval of beginning positions of said wobble-groups on said track is equal to N times (N is an integer equal to or greater than 1) of the predetermined interval of said synchronization signal when said record information is recorded on said track, said apparatus comprising:

a wobble detecting device for detecting a wobble signal corresponding to said wobble from said information record disc;

a phase detecting device for detecting a phase of said wobble signal and then generating a detection signal indicative of a change in the phase of said wobble signal;

a positional information demodulating device for demodulating said positional information in accordance with said detection signal;

a signal generating device for detecting a timing of said beginning position of said wobble-group from said detection signal, and then generating a control signal indicative of the predetermined interval of said synchronization signal in said record information on the basis of the detected timing; and a recording device for specifying a record position on said disc surface on the basis of the positional information demodulated by said positional information demodulating device and the control signal generated by said signal generating device, and then recording said record information from said specified record position so that the interval of said beginning positions of said wobble-groups is equal to N times the predetermined interval of said synchronization signal.

4. An information recording apparatus according to claim 3, wherein said phase detecting device comprises an averaging device for averaging timings of said beginning positions of each of said wobble-groups.

* * * * *